United States Patent
Gosselin et al.

(10) Patent No.: US 11,740,608 B2
(45) Date of Patent: Aug. 29, 2023

(54) COMPUTER NUMERICALLY CONTROLLED FABRICATION USING PROJECTED INFORMATION

(71) Applicant: Glowforge Inc., Seattle, WA (US)

(72) Inventors: Mark Gosselin, Seattle, WA (US); Daniel Shapiro, Mercer Island, WA (US); Penelope Ackerman, Seattle, WA (US); Daniel Martinec, Kirkland, WA (US); Kevin McVey, Seattle, WA (US); Michael Natkin, Seattle, WA (US); Therese Seldon, Seattle, WA (US)

(73) Assignee: Glowforge, Inc, Seattle, WA (US)

( * ) Notice: Subject to any disclaimer, the term of this patent is extended or adjusted under 35 U.S.C. 154(b) by 0 days.

(21) Appl. No.: 17/133,908

(22) Filed: Dec. 24, 2020

(65) Prior Publication Data
US 2022/0206464 A1    Jun. 30, 2022

(51) Int. Cl.
G05B 19/4093    (2006.01)

(52) U.S. Cl.
CPC ............ *G05B 19/40932* (2013.01); *G05B 2219/31048* (2013.01)

(58) Field of Classification Search
CPC ............ G05B 19/40932; G05B 2219/31048
See application file for complete search history.

(56) References Cited

U.S. PATENT DOCUMENTS

| | | |
|---|---|---|
| 3,721,811 A | 3/1973 | Taylor et al. |
| 3,967,176 A | 6/1976 | Wagener et al. |

(Continued)

FOREIGN PATENT DOCUMENTS

| | | |
|---|---|---|
| CN | 101095033 A | 12/2007 |
| CN | 101733558 A | 6/2010 |

(Continued)

OTHER PUBLICATIONS

Dazhong Wu et al. "Cloud Manufacturing: Drivers, Current Status, and Future Trends." vol. 2. Systems; Micro And Nano Technologies Sustainable Manufacturing. Jun. 10, 2013. Retrieved on May 10, 2016. pp. 1-10.

(Continued)

*Primary Examiner* — Kenneth M Lo
*Assistant Examiner* — Mohammed Shafayet
(74) *Attorney, Agent, or Firm* — Lee Sullivan Shea & Smith LLP

(57) ABSTRACT

A method may include projecting, onto a surface within a computer numerically controlled machine, a structured light having a known property. One or more sensors may generate an image of the structured light projected on the surface within the computer numerically controlled machine. One or more characteristics of the surface may be determined by comparing a property of the structured light shown in the image to the known property of the structured light. Examples of characteristics include a size, a distance to the surface, a height, a thickness, an angle of the surface, edges, surface properties, jigs, fiducial alignment markers, patterns encoding data, and visual designs on the surface of the material that are intended for reproductions. A surface map indicating the characteristics of the surface at various locations may be generated to enable, for example, a calibration, alignment, and/or optimization of the computer numerically controlled machine.

40 Claims, 14 Drawing Sheets

(56) References Cited

U.S. PATENT DOCUMENTS

| | | |
|---|---|---|
| 4,055,787 A | 10/1977 | Beadle et al. |
| 4,138,718 A | 2/1979 | Toke et al. |
| 4,383,762 A | 5/1983 | Burkert |
| 4,650,287 A | 3/1987 | Kudo et al. |
| 4,723,219 A | 2/1988 | Beyer et al. |
| 4,863,538 A | 9/1989 | Deckard |
| 4,894,831 A | 1/1990 | Alfrey |
| 4,901,359 A | 2/1990 | Bruder |
| 4,918,611 A | 4/1990 | Shyu et al. |
| 5,298,843 A | 3/1994 | Miyajima et al. |
| 5,355,250 A | 10/1994 | Grasso et al. |
| 5,396,279 A | 3/1995 | Vossen |
| 5,475,521 A | 12/1995 | Heidemann |
| 5,682,319 A | 10/1997 | Boland et al. |
| 5,756,961 A | 5/1998 | Sato et al. |
| 6,031,200 A | 2/2000 | Whitehouse |
| 6,085,122 A | 7/2000 | Manning |
| 6,087,625 A | 7/2000 | Iso |
| 6,284,999 B1 | 9/2001 | Virtanen et al. |
| 6,420,674 B1 | 7/2002 | Cole, III et al. |
| 6,420,675 B1 | 7/2002 | Lizotte et al. |
| 6,498,653 B1 | 12/2002 | Wang |
| 6,528,758 B2 | 3/2003 | Shaffer |
| 6,609,044 B1 | 8/2003 | Basista et al. |
| 6,628,322 B1 | 9/2003 | Cerruti |
| 6,696,667 B1 | 2/2004 | Flanagan |
| 7,005,606 B2 | 2/2006 | Legge et al. |
| 7,456,372 B2 | 11/2008 | Hiramatsu |
| 8,111,904 B2 | 2/2012 | Wallack et al. |
| 8,136,432 B2 | 3/2012 | Travez et al. |
| 8,786,928 B2 | 7/2014 | Dolleris et al. |
| 8,809,780 B2 | 8/2014 | Wollenhaupt et al. |
| 8,921,734 B2 | 12/2014 | Yerazunis et al. |
| 9,020,628 B2 | 4/2015 | Fagan |
| 9,235,205 B2 | 1/2016 | Prestidge et al. |
| 9,469,338 B2 | 10/2016 | Norberg Ohlsson |
| 9,618,926 B1 | 4/2017 | Louette et al. |
| 9,734,419 B1 | 8/2017 | Ye et al. |
| 9,782,906 B1 | 10/2017 | Aminpour et al. |
| 9,912,915 B2 | 3/2018 | Sinclair |
| 9,987,798 B2 | 6/2018 | Tyler |
| 10,234,260 B2 | 3/2019 | Siercks et al. |
| 10,379,517 B2 | 8/2019 | Shapiro et al. |
| 10,509,390 B2 | 12/2019 | Shapiro et al. |
| 10,642,251 B2 | 5/2020 | Platts et al. |
| 10,737,355 B2 | 8/2020 | Shapiro et al. |
| 2001/0012973 A1 | 8/2001 | Wehrli et al. |
| 2002/0129485 A1 | 9/2002 | Mok et al. |
| 2002/0144987 A1 | 10/2002 | Tomlinson et al. |
| 2003/0049373 A1 | 3/2003 | Van De Rijdt et al. |
| 2004/0207831 A1 | 10/2004 | Aoyama |
| 2004/0223165 A1 | 11/2004 | Kurokawa et al. |
| 2004/0245227 A1 | 12/2004 | Grafton-Reed et al. |
| 2005/0051523 A1 | 3/2005 | Legge et al. |
| 2005/0069682 A1 | 3/2005 | Tseng |
| 2005/0071020 A1 | 3/2005 | Yamazaki et al. |
| 2005/0115941 A1 | 6/2005 | Sukhman et al. |
| 2005/0142701 A1 | 6/2005 | Yamaguchi et al. |
| 2005/0187651 A1 | 8/2005 | Kimura et al. |
| 2006/0043615 A1 | 3/2006 | Zheng et al. |
| 2007/0000889 A1 | 1/2007 | Yamazaki et al. |
| 2007/0032733 A1 | 2/2007 | Burton |
| 2007/0034615 A1 | 2/2007 | Kleine |
| 2008/0058734 A1 | 3/2008 | Hanft et al. |
| 2008/0149604 A1 | 6/2008 | Varriano-Marston et al. |
| 2008/0160254 A1 | 7/2008 | Arnold |
| 2008/0243299 A1 | 10/2008 | Johnson et al. |
| 2008/0249653 A1 | 10/2008 | Ichikawa |
| 2009/0120914 A1 | 5/2009 | Lawrence |
| 2009/0250445 A1 | 10/2009 | Yamaguchi et al. |
| 2009/0308851 A1 | 12/2009 | Harnisch et al. |
| 2010/0063603 A1 | 3/2010 | Chandhoke |
| 2010/0081971 A1 | 4/2010 | Allison |
| 2010/0149337 A1 | 6/2010 | Porcino |
| 2010/0193482 A1 | 8/2010 | Ow et al. |
| 2010/0193483 A1 | 8/2010 | Chen et al. |
| 2010/0274379 A1 | 10/2010 | Hehl |
| 2010/0301023 A1 | 12/2010 | Unrath et al. |
| 2011/0127333 A1 | 6/2011 | Veksland et al. |
| 2011/0193943 A1 | 8/2011 | Campbell |
| 2011/0316977 A1 | 12/2011 | Pienaar |
| 2012/0035745 A1 | 2/2012 | Mori et al. |
| 2012/0117787 A1 | 5/2012 | Sun et al. |
| 2012/0197427 A1 | 8/2012 | Gallucci et al. |
| 2012/0293821 A1 | 11/2012 | Chiba |
| 2013/0158957 A1 | 6/2013 | Lee et al. |
| 2013/0178972 A1 | 7/2013 | Goldsmith et al. |
| 2013/0190898 A1 | 7/2013 | Shilpiekandula et al. |
| 2013/0200053 A1 | 8/2013 | Bordatchev |
| 2013/0211391 A1 | 8/2013 | BenYakar et al. |
| 2013/0304248 A1 | 11/2013 | Lange et al. |
| 2014/0005804 A1 | 1/2014 | Brand |
| 2014/0018779 A1 | 1/2014 | Worrell et al. |
| 2014/0039707 A1 | 2/2014 | Curtis et al. |
| 2014/0071330 A1 | 3/2014 | Zhang et al. |
| 2014/0071502 A1 | 3/2014 | Liu |
| 2014/0160273 A1 | 6/2014 | Jedynak et al. |
| 2014/0268607 A1 | 9/2014 | Wicker et al. |
| 2014/0310122 A1 | 10/2014 | Danielson et al. |
| 2014/0371895 A1 | 12/2014 | Sadusk et al. |
| 2015/0030821 A1 | 1/2015 | Costin, Sr. et al. |
| 2015/0107033 A1 | 4/2015 | Chang et al. |
| 2015/0108095 A1 | 4/2015 | Kruer et al. |
| 2015/0112470 A1 | 4/2015 | Chang et al. |
| 2015/0154453 A1 | 6/2015 | Wilf |
| 2015/0158311 A1 | 6/2015 | Ogasawara et al. |
| 2015/0197064 A1 | 7/2015 | Walker et al. |
| 2015/0212421 A1 | 7/2015 | deVilliers et al. |
| 2015/0245549 A1 | 8/2015 | Kurita et al. |
| 2015/0355621 A1 | 12/2015 | Ikeda et al. |
| 2015/0360318 A1 | 12/2015 | Aubry |
| 2015/0378348 A1 | 12/2015 | Gupta et al. |
| 2016/0059371 A1 | 3/2016 | Chang et al. |
| 2016/0084649 A1 | 3/2016 | Yamazaki et al. |
| 2016/0147213 A1 | 5/2016 | Murakami |
| 2016/0156771 A1 | 6/2016 | Lee |
| 2016/0199945 A1 | 7/2016 | McDowell et al. |
| 2016/0210737 A1 | 7/2016 | Straub et al. |
| 2016/0271718 A1 | 9/2016 | Fagan |
| 2016/0303845 A1 | 10/2016 | Arce |
| 2016/0325541 A1 | 11/2016 | Lavrentyev et al. |
| 2016/0360409 A1 | 12/2016 | Singh |
| 2017/0008127 A1 | 1/2017 | Hyatt et al. |
| 2017/0045877 A1* | 2/2017 | Shapiro ............... B23K 26/032 |
| 2017/0045879 A1 | 2/2017 | Yang et al. |
| 2017/0057008 A1 | 3/2017 | Liu et al. |
| 2017/0102689 A1* | 4/2017 | Khajepour ............ G01N 25/18 |
| 2017/0123362 A1 | 5/2017 | Masui et al. |
| 2017/0235293 A1 | 8/2017 | Shapiro et al. |
| 2017/0235294 A1 | 8/2017 | Shapiro et al. |
| 2017/0241767 A1* | 8/2017 | Miyata ................... G06V 10/42 |
| 2017/0243374 A1 | 8/2017 | Matsuzawa |
| 2017/0341183 A1 | 11/2017 | Buller et al. |
| 2018/0001565 A1 | 1/2018 | Hocker |
| 2018/0113434 A1 | 4/2018 | Shapiro et al. |
| 2018/0147657 A1 | 5/2018 | Shapiro |
| 2018/0147658 A1 | 5/2018 | Shapiro |
| 2018/0147659 A1 | 5/2018 | Shapiro |
| 2018/0150047 A1 | 5/2018 | Shapiro |
| 2018/0150055 A1 | 5/2018 | Shapiro |
| 2018/0150058 A1 | 5/2018 | Shapiro |
| 2018/0150062 A1 | 5/2018 | Shapiro |
| 2019/0058870 A1 | 2/2019 | Rowell et al. |
| 2019/0278250 A1 | 9/2019 | Clement et al. |
| 2019/0310604 A1 | 10/2019 | Shapiro et al. |
| 2019/0329322 A1* | 10/2019 | Preston ................ B29C 64/386 |
| 2020/0064806 A1 | 2/2020 | Shapiro et al. |
| 2020/0073362 A1 | 3/2020 | Shapiro et al. |
| 2020/0089184 A1 | 3/2020 | Shapiro et al. |
| 2020/0089185 A1 | 3/2020 | Shapiro et al. |
| 2020/0125071 A1 | 4/2020 | Shapiro et al. |
| 2020/0192332 A1 | 6/2020 | Jacobs et al. |

(56) References Cited

U.S. PATENT DOCUMENTS

| | | | | |
|---|---|---|---|---|
| 2020/0269322 | A1* | 8/2020 | Das | C30B 13/32 |
| 2020/0398457 | A1 | 12/2020 | Zhang et al. | |
| 2021/0053280 | A1* | 2/2021 | DeMuth | B29C 64/245 |

FOREIGN PATENT DOCUMENTS

| | | |
|---|---|---|
| CN | 101837517 A | 9/2010 |
| CN | 205958834 U | 2/2017 |
| CN | 106670656 A | 5/2017 |
| DE | 10 2014 214 058 A1 | 1/2016 |
| EP | 0 954 125 A2 | 11/1999 |
| EP | 1 309 108 A1 | 5/2003 |
| EP | 2 471 625 A2 | 7/2012 |
| EP | 2 808 123 A1 | 12/2014 |
| JP | H03 254380 A | 11/1991 |
| JP | 04-244347 A | 9/1992 |
| JP | 2002-123306 A | 4/2002 |
| WO | WO-94/03302 A1 | 2/1994 |
| WO | WO-01/076250 A1 | 10/2001 |
| WO | WO-2016/131019 A1 | 8/2016 |
| WO | WO-2016/131022 A1 | 8/2016 |

OTHER PUBLICATIONS

Examination Report issued in European Patent Application No. 16709185.9, dated Jul. 1, 2020 (dated Jul. 1, 2020). 5 pages.
First Office Action issued in Chinese Patent Application No. 201680021337.8, dated Apr. 10, 2019. 6 pages. [Chinese language].
First Office Action issued in Chinese Patent Application No. 201680021337.8, dated Apr. 10, 2019. 8 pages. [English language translation].
Gao, Rong et al. "Human-Machine Collaborative Workshop Digital Manufacturing." *ICICTA*. 2010 IEEE. May 11, 2010. pp. 445-448.
Inmagine Group. Vectr Free Online Vector Graphics Software. Retrieved Mar. 22, 2021, from https://vectr.com/. 3 pages.
International Search Report and Written Opinion issued in International Application No. PCT/US2016/017900, dated May 27, 2016. 16 pages.
International Search Report and Written Opinion issued in International Application No. PCT/US2016/017901, dated Jun. 3, 2016 (dated Jun. 3, 2016). 13 pages.
International Search Report and Written Opinion issued in International Application No. PCT/US2016/017903, dated Jun. 1, 2016. 15 pages.
International Search Report and Written Opinion issued in International Application No. PCT/US2016/017904, dated May 23, 2016. (dated May 23, 2016). 19 pages.
International Search Report and Written Opinion issued in International Application No. PCT/US2017/063187, dated Apr. 3, 2018 (dated Apr. 3, 2018). 11 pages.
International Search Report and Written Opinion issued in International Application No. PCT/US2017/063188, dated Feb. 16, 2018 (dated Feb. 16, 2018). 14 pages.
International Search Report and Written Opinion issued in International Application No. PCT/US2017/063189, dated May 2, 2018 (May 2, 2018). 22 pages.
International Search Report and Written Opinion issued in International Application No. PCT/US2017/063190, dated May 3, 2018 (dated May 3, 2018). 18 pages.
International Search Report and Written Opinion issued in International Application No. PCT/US2017/063191, dated Mar. 21, 2018 (dated Mar. 21, 2018). 12 pages.
International Search Report and Written Opinion issued in International Application No. PCT/US2017/063192, dated Apr. 19, 2018 (dated Apr. 19, 2018). 12 pages.
International Search Report and Written Opinion issued in International Application No. PCT/US2017/063193, dated Feb. 16, 2018 (dated Feb. 16, 2018). 12 pages.
Second Office Action issued in Chinese Patent Application No. 201680021337.8, dated Nov. 4, 2019. 3 pages. [Chinese language].
Second Office Action issued in Chinese Patent Application No. 201680021337.8, dated Nov. 4, 2019. 4 pages. [English language translation].
Third Office Action issued in Chinese Patent Application No. 201680021337.8, dated Jul. 23, 2020. 11 pages. [Chinese language].
Third Office Action issued in Chinese Patent Application No. 201680021337.8, dated Jul. 23, 2020. 20 pages. [English language translation].

* cited by examiner

COMPUTER NUMERICALLY CONTROLLED FABRICATION USING PROJECTED INFORMATION

TECHNICAL FIELD

The subject matter described herein relates generally to computer numerically controlled fabrication and more specifically computer numerically controlled fabrication aided with projected information.

BACKGROUND

Computer controlled manufacturing systems, such as "3-D printers," laser cutter/engravers, computer numerically controlled milling machines, and the like, can be used to create complicated items where traditional manufacturing techniques like moldings or manual assembly fail. Such automated methods operate based on instructions that specify the cuts, engravings, patterns, and other actions to be performed. The instructions can be in the form of computer files transferred to the memory of a computer controller for the machine and interpreted at run-time to provide a series of steps in the manufacturing process.

SUMMARY

Systems, methods, and articles of manufacture, including apparatuses, are provided for computer numerically controlled fabrication aided with projected information. In one aspect, there is provided a method that includes: receiving, from one or more sensors, a first image of a structured light projected on a surface within a computer numerically controlled machine having a head configured to deliver an electromagnetic energy, the structured light forming a pattern on the surface; determining, based at least on the first image, one or more characteristics of the surface at a plurality of locations on the surface, the determining includes comparing a property of the structured light shown in the first image to a known property of the structured light; and generating a first surface map indicating the one or more characteristics of the surface at the plurality of locations on the surface.

In some variations, one or more features disclosed herein including the following features can optionally be included in any feasible combination. The structured light may be a visible light. The one or more sensors may include a camera capable of capturing the visible light.

In some variations, the structured light may be an infrared light. The one or more sensors may include a camera capable of capturing a visible light and the infrared light.

In some variations, the one or more characteristics may include a size, a distance, a height, a thickness, an edge, an angle, an absorptivity of the surface, a presence of a jig, a pattern encoding data, visual designs on the surface of the material that are intended for reproduction, and/or a presence of a fiducial alignment marker.

In some variations, the first image may capture an entirety of the surface within the computer numerically controlled machine and/or an entirety of the structured light projected on the surface.

In some variations, the surface may be a surface of a material disposed within the computer numerically controlled machine.

In some variations, a graphic user interface providing a preview of the surface of the material may be generated based at least on the first image. The preview of the surface of the material may identify the one or more characteristics of at least one of the plurality locations on the surface of the material.

In some variations, a second image of the surface of the material without the structured light projected on the surface of the material may be received from the one or more sensors. A graphic user interface providing a preview of the surface of the material may be generated based at least on the second image.

In some variations, the material may be processed based at least on the first surface map including by delivering the electromagnetic energy to affect one or more changes in the material.

In some variations, a second surface map of the material may be generated subsequent to delivering the electromagnetic energy to affect the one or more changes in the material.

In some variations, whether the one or more changes are consistent with an intended final appearance of the material may be determined based at least on the second surface map.

In some variations, a variability in a power level of the electromagnetic energy delivered by the head may be determined based at least on the second surface map.

In some variations, the surface may be a surface of a component of the computer numerically controlled machine.

In some variations, one or more configurations of the computer numerically controlled machine including an addition and/or a removal of the component of the computer numerically controlled machine may be determined based at least on the first surface map.

In some variations, the structured light may be generated by a non-laser light source.

In some variations, the structured light may be generated by a laser light source.

In some variations, the laser light source may include a Vertical-Cavity Surface Emitting Laser (VCSEL) array.

In some variations, the structured light may be generated by a non-laser light source.

In some variations, the laser light source may include a source of the electromagnetic energy. The structured light may be projected by the source of the electromagnetic energy operating at a reduced power level such that the electromagnetic energy delivered is incapable of altering an appearance of the surface.

In some variations, the first image may be an image of the structured light projected by the source of the electromagnetic energy operating at a first power level. A power of the electromagnetic energy delivered by the source of the electromagnetic energy operating at a higher power level may be extrapolated based at least on the first image and a second image of the structured light projected by the head operating at a second power level.

In some variations, a loss in the power of the electromagnetic energy may be detected based at least on the first image, the second image, and a third image of the structured light generated at a different time than the first image and the second image.

In some variations, one or more of a power of the electromagnetic energy, a focus of the electromagnetic energy, a filter of the one or more sensors, an aperture of the one or more sensors, and a shutter speed of the one or more sensors may be adjusted based at least on a proportion of the electromagnetic energy absorbed by the surface.

In some variations, the one or more characteristics of the surface may be further determined by at least comparing the first image to a reference image of the structured light projected on a reference surface.

In some variations, the first image and the reference image may be compared by at least determining a transform configured to generate, based at least on the first image, a second image matching the reference image. The transform may generate the second image by at least eliminating one or more distortions in the first image of the structured light corresponding to the one or more irregularities on the surface.

In some variations, the first surface map may be generated based at least on the transform.

In some variations, one or more calibrations may be performed to remove, from the first image, one or more optical distortions associated with the one or more sensors. The one or more optical distortions may include an optical distortion associated with the surface being disposed at a short distance from the one or more sensors.

In another aspect, there is provided a system that includes at least one data processor and at least memory. The at least one memory may store instructions that cause operations when executed by the at least one data processor. The operations may include: receiving, from one or more sensors, a first image of a structured light projected on a surface within a computer numerically controlled machine configured to deliver an electromagnetic energy, the structured light forming a pattern on the surface; determining, based at least on the first image, one or more characteristics of the surface at a plurality of locations on the surface, the determining includes comparing a property of the structured light shown in the first image to a known property of the structured light; and generating a first surface map indicating the one or more characteristics of the surface at the plurality of locations on the surface.

In some variations, one or more features disclosed herein including the following features can optionally be included in any feasible combination. The one or more characteristics may include a size, a distance, a height, a thickness, an edge, an angle, an absorptivity of the surface, a presence of a jig, a pattern encoding data, visual designs on the surface of the material that are intended for reproduction, and/or a presence of a fiducial alignment marker.

In some variations, the first image may capture an entirety of the surface within the computer numerically controlled machine and/or an entirety of the structured light projected on the surface.

In some variations, the surface may be a surface of a material disposed within the computer numerically controlled machine.

In some variations, a graphic user interface providing a preview of the surface of the material may be generated based at least on the first image. The preview of the surface of the material may identify the one or more characteristics of at least one of the plurality locations on the surface of the material.

In some variations, a second image of the surface of the material without the structured light projected on the surface of the material may be received from the one or more sensors. A graphic user interface providing a preview of the surface of the material may be generated based at least on the second image.

In some variations, the material may be processed based at least on the first surface map including by delivering the electromagnetic energy to affect one or more changes in the material.

In some variations, a second surface map of the material may be generated subsequent to delivering the electromagnetic energy to affect the one or more changes in the material. At least one of (i) a consistency of the one or more changes relative to an intended final appearance of the material and (ii) a variability in a power level of the electromagnetic energy may be determined based at least on the second surface map.

In some variations, the structured light may be generated by a non-laser light source.

In some variations, the structured light may be generated by a laser light source including a Vertical-Cavity Surface Emitting Laser (VCSEL) array.

In some variations, the structured light may be generated by a laser light source including the source of the electromagnetic energy. The structured light may be projected by the source of the electromagnetic energy operating at a reduced power level such that the electromagnetic energy delivered is incapable of altering an appearance of the surface.

In some variations, the first image may be an image of the structured light projected by the source of the electromagnetic energy operating at a first power level. A power of the electromagnetic energy delivered by the source of the electromagnetic energy operating at a higher power level may be extrapolated based at least on the first image and a second image of the structured light projected by the head operating at a second power level.

In some variations, a loss of power in the electromagnetic energy may be detected based at least on the first image, the second image, and a third image of the structured light generated at a different time than the first image and the second image.

In some variations, one or more of a power of the electromagnetic energy, a focus of the electromagnetic energy, a filter of the one or more sensors, an aperture of the one or more sensors, and a shutter speed of the one or more sensors may be adjusted based at least on a proportion of the electromagnetic energy absorbed by the surface.

In some variations, the one or more characteristics of the surface may be further determined by at least comparing the first image to a reference image of the structured light projected on a reference surface. The first image and the reference image may be compared by at least determining a transform configured to generate, based at least on the first image, a second image matching the reference image. The transform may generate the second image by at least eliminating one or more distortions in the first image of the structured light corresponding to the one or more irregularities on the surface. The first surface map may be generated based at least on the transform.

In another aspect, there is provided a computer program product including a non-transitory computer readable medium storing instructions. The instructions may result in operations when executed by at least one data processor. The operations may include: receiving, from one or more sensors, one or more images of a structured light projected on a surface within a computer numerically controlled machine having a head configured to deliver an electromagnetic energy, the structured light forming a pattern on the surface; determining, based at least on the one or more images, one or more characteristics of the surface at a plurality of locations on the surface, the determining includes comparing a property of the structured light shown in the one or more images to a known property of the structured light; and generating a surface map indicating the one or more characteristics of the surface at the plurality of locations on the surface.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, a connection over a network (e.g. the Internet, a wireless wide area network, a local area network, a wide area network, a wired network, or the like), via a direct connection between one or more of the multiple computing systems, and/or the like.

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to using projected information to aid automated manufacturing processes such as a computer numerically controlled fabrication process, it should be readily understood that such features are not intended to be limiting.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
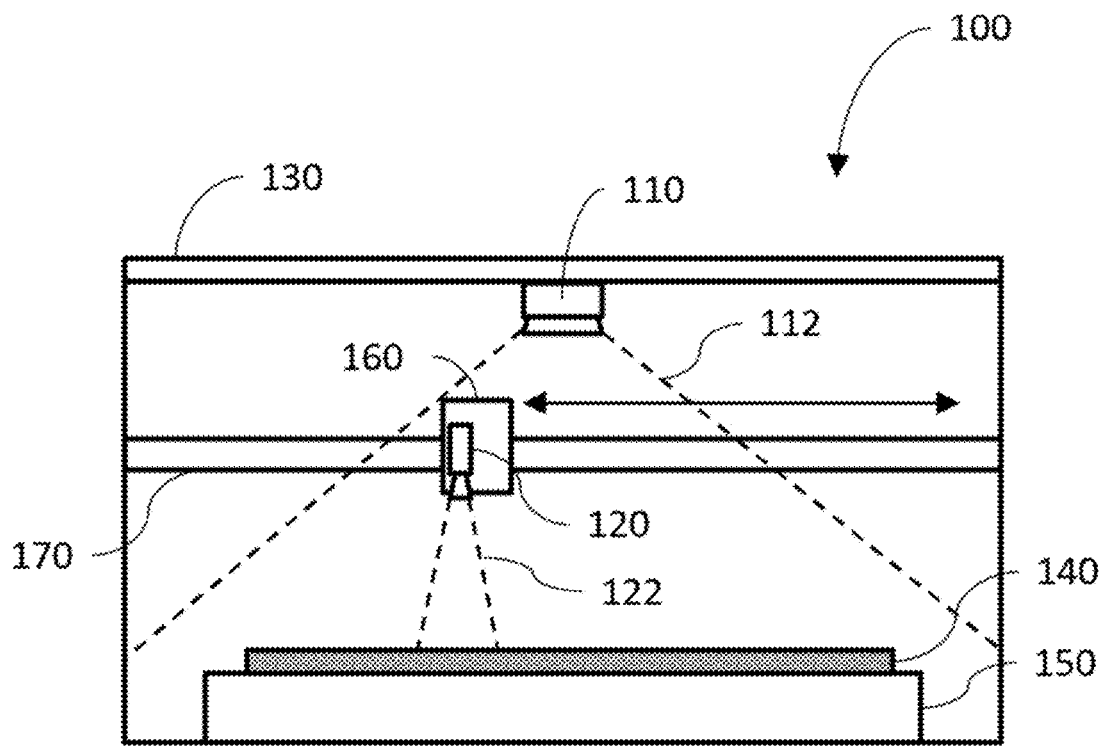
FIG. 1 depicts an elevational view of an example of a computer numerically controlled machine consistent with some implementations of the current subject matter.

A computer numerically controlled machine may include a source configured to emit electromagnetic energy, for example, in the form of laser. Electromagnetic energy from the source may be routed to a head configured to deliver the electromagnetic energy to a destination such as, for example, a portion of a material disposed on top of a material bed and positioned in a working area defined by limits within which the head is commanded to cause delivery of the electromagnetic energy. Moreover, the working area may be inside an interior space of the computer numerically controlled machine, which may be defined by a housing including an openable barrier, for example, a lid, a door, a hatch, a flap, and/or the like, that attenuates the transmission of electromagnetic energy between the interior space and an exterior of the computer numerically controlled machine when the openable barrier is in a closed position.

To process the material to achieve an intended final appearance of the material, the computer numerically controlled machine may be required to perform one or more measurements to determine, for example, a size of the material, a distance to the surface of the material, a height of at least one surface of the material, a thickness of the material, an angle of the surface of the material, one or more edges of the material, one or more surface properties of the material (e.g., absorptivity), a presence of jigs, a presence of fiducial alignment markers, a presence of one or more patterns encoding data (e.g., barcode), visual designs on the surface of the material that are intended for reproductions, and/or the like. In order for the computer numerically controlled machine to perform these measurements accurately, the computer numerically controlled machine may undergo various calibration, alignment, and optimization procedures. For example, calibration data may be used to eliminate errors introduced by manufacturing defects and/or configuration variations at the computer numerically controlled machine. The calibration, alignment, and/or optimization of the computer numerically controlled machine may include determining one or more characteristics of a surface within the interior space of the computer numerically controlled machine including, for example, a size of the material, a distance to the surface of the material, a height of at least one surface of the material, a thickness of the material, an angle of the surface of the material, one or more edges of the material, one or more surface properties of the material (e.g., absorptivity), a presence of jigs, a presence of fiducial alignment markers, a presence of one or more patterns encoding data (e.g., barcode), visual designs on the surface of the material that are intended for reproduction, and/or the like. Examples of various surfaces that may be present within the interior space of the computer numerically controlled machine may include the material positioned in the working area, a jig, fixture, and/or a component of the computer numerically controlled machine (e.g., the material bed holding the material, the interior walls of the housing of the computer numerically controlled machine, a head delivering an electromagnetic energy, and/or), and a feature within the computer numerically controlled machine (e.g., an area formed from a different material or containing a mark).

Some techniques for determining one or more characteristics of a surface within the interior space of the computer numerically controlled machine may be more suitable for flat, uniform surfaces resting on a flat substrate. For example, the thickness of a piece of material having a uniform thickness that is resting on a flat substrate may be determined based on a single dot of light projected onto the surface of the material at a single location. However, projecting a single dot of light at a single location onto the surface of the material having any surface irregularities (e.g., bumps, cracks, cavities, curvatures, ridges, slopes, and/or the like) may be insufficient at least because the thickness of the material may vary due to the presence of the surface irregularities.

Structured light may be light having one or more known properties such as the quantity of rays of light, the pattern formed by the rays of light, the distribution of the rays of light, and/or the like. For example, one or more known properties of the structured light may be predetermined based on the design characteristics of a source of the structured light (e.g., a projector or another apparatus). Alternatively and/or additionally, one or more known properties of the structured light may be predetermined through calibration of the computer numerically controlled machine. For instance, the structured light may include 81 rays of light in a 9×9 grid separated by 4.9 degree angles due to the design characteristics and manufacturing parameters associated with the source of the structured light.

In some implementations of the current subject matter, structured light may be projected on at least a portion of a surface within the interior space of a computer numerically controlled machine in order to determine one or more characteristics of the surface including, for example, a size of the material, a distance to the surface of the material, a height of at least one surface of the material, a thickness of the material, an angle of the surface of the material, one or more edges of the material, one or more surface properties of the material (e.g., absorptivity), a presence of jigs, a presence of fiducial alignment markers, a presence of one or more patterns encoding data (e.g., barcode), visual designs on the surface of the material that are intended for reproduction, and/or the like. The structured light may include multiple dots of light forming a pattern such as, for example, crisscross lines, a grid, and/or the like. Moreover, the structured light may be generated by a variety of light sources including, for example, non-laser sources (e.g., light emitting diodes (LEDs)), multiple laser light sources (e.g., a Vertical-Cavity Surface Emitting Laser (VCSEL) array), a single light source that's split into multiple beams with a holographic optical element, and/or the like. For example, the computer numerically controlled machine may include one or more stationary light sources and/or mobile light sources configured to generate the structured light. The structured light may be used to determine one or more characteristics of the surface even when the surface exhibits one or more irregularities such as bumps, cracks, cavities, curvatures, ridges, slopes, and/or the like. The structured light may be visible or invisible to the human eye.

In some implementations of the current subject matter, the one or more characteristics of the material may be used to verify a fabrication in which the computer numerically controlled machine has processed the material or is in the middle of processing the material to achieve one or more designs. For example, the height of the material at various locations may confirm that material was successfully removed, or may indicate the presence of irregularities (e.g., corrugation, folds, and/or the like) that may result in one or more anomalies during the fabrication. Accordingly, verifying a fabrication based on the characteristics of a material may trigger one or more outputs including, for example, alerts, recommendations, and/or the like. For instance, an alert may be generated in response to the verification of the fabrication to indicate success, or to indicate one or more possible anomalies. Alternatively and/or additionally, one or more recommendations, such as, for example, canceling the fabrication, proceeding with the fabrication, and/or corrective actions to avoid the anomalies, may be generated based on the result of the verification.

In some implementations of the current subject matter, the computer numerically controlled machine may include one or more sensors configured to detect the structured light that is projected onto the surface within the interior space of the computer numerically controlled machine. For example, the structured light that is projected onto the surface of a material within the interior space of the computer numerically controlled machine may be detected by a single stationary camera mounted to the openable barrier (e.g., the lid) of the computer numerically controlled machine. The camera may be configured to generate one or more images, each of which capturing substantially an entirety of the material bed and/or the working area of the computer numerically controlled machine. As such, the camera may be configured to generate each of the one or more images to capture substantially an entirety of the surface of the material disposed within the working area and/or the structured light that is projected on the surface of the material. Alternatively and/or additionally, the camera may be configured to generate multiple images, each of which capturing a portion of the surface of the material within the working area and/or the structured light that is projected on the surface of the material. A single image capturing a larger portion of the surface of the material, such as the entire surface of the material (or substantially the entire surface of the material), may be generated by stitching together two or more images that capture smaller portions of the surface of the material.

One or more characteristics of the surface of the material may be determined based on the one or more images capturing substantially the entirety of the material bed and/or the working area of the computer numerically controlled machine. For example, these images may be used to generate a surface map of the material indicating, for example, a size of the material, a distance to the surface of the material, a height of at least one surface of the material, a thickness of the material, an angle of the surface of the material, one or more edges of the material, one or more surface properties of the material (e.g., absorptivity), a presence of jigs, a presence of fiducial alignment markers, a presence of one or more patterns encoding data (e.g., barcode), visual designs on the surface of the material that are intended for reproduction, and/or the like. The surface map may be further used to calibrate, align, and/or optimize the computer numerically controlled machine. It should be appreciated that the one or more characteristics of the material may also enable the determination of additional properties of the material. For instance, warpage is one example of a property of a material that may be determined by measuring one or more characteristics of the material such as the height of the material and/or a change in height across the material. Further, the presence of warpage in the material may be used to determine a moisture level or humidity of the material, which may be used to further inform the parameters associated with the processing of the material.

Alternatively and/or additionally, a surface map may be generated of the surface of the material subsequent to processing and used to verify the accuracy of the processing (e.g., whether the depth of the engraving is consistent with an intended design, variability in the power level of the electromagnetic energy delivered to the material, and/or the like).

As used herein, the term "cutting" can generally refer to altering the appearance, properties, and/or state of a material. Cutting can include, for example, making a through-cut, engraving, bleaching, curing, burning, etc. Engraving, when specifically referred to herein, indicates a process by which a computer numerically controlled machine modifies the appearance of the material without fully penetrating it. For example, in the context of a laser cutter, it can mean removing some of the material from the surface and/or discoloring the material (e.g. through an application of focused electromagnetic energy delivering electromagnetic energy as described below).

As used herein, the term "laser" includes any electromagnetic energy or focused or coherent energy source that (in the context of being a cutting tool) uses photons to modify a substrate or cause some change or alteration upon a material impacted by the photons. Lasers (whether cutting tools or diagnostic) can be of any desired wavelength, including for example, microwave, lasers, infrared lasers, visible lasers, UV lasers, X-ray lasers, gamma-ray lasers, or the like.

Also, as used herein, "cameras" includes, for example, visible light cameras, black and white cameras, IR or UV sensitive cameras, individual brightness sensors such as photodiodes, sensitive photon detectors such as a photomultiplier tube or avalanche photodiodes, detectors of infrared energy far from the visible spectrum such as microwaves, X-rays, or gamma rays, optically filtered detectors, spectrometers, and other detectors that can include sources providing electromagnetic energy for illumination to assist with acquisition, for example, flashes, UV lighting, etc.

Also, as used herein, reference to "real-time" actions includes some degree of delay or latency, either programmed intentionally into the actions or as a result of the limitations of machine response and/or data transmission. "Real-time" actions, as used herein, are intended to only approximate an instantaneous response, or a response performed as quickly as possible given the limits of the system, and do not imply any specific numeric or functional limitation to response times or the machine actions resulting therefrom.

Also, as used herein, unless otherwise specified, the term "material" is the material that is on the bed of the computer numerically controlled machine. For example, if the computer numerically controlled machine is a laser cutter, the material is what is placed in the computer numerically controlled machine to be cut, for example, the raw materials, stock, or the like. The computer numerically controlled (CNC) machine may be a machine that is used to perform subtractive processing (e.g., by removing the material) under the control of a computer, in which case the computer numerically controlled machine may include one or more motors (or other actuators) that move one or more heads performing the removal of the material.

Figure 2:
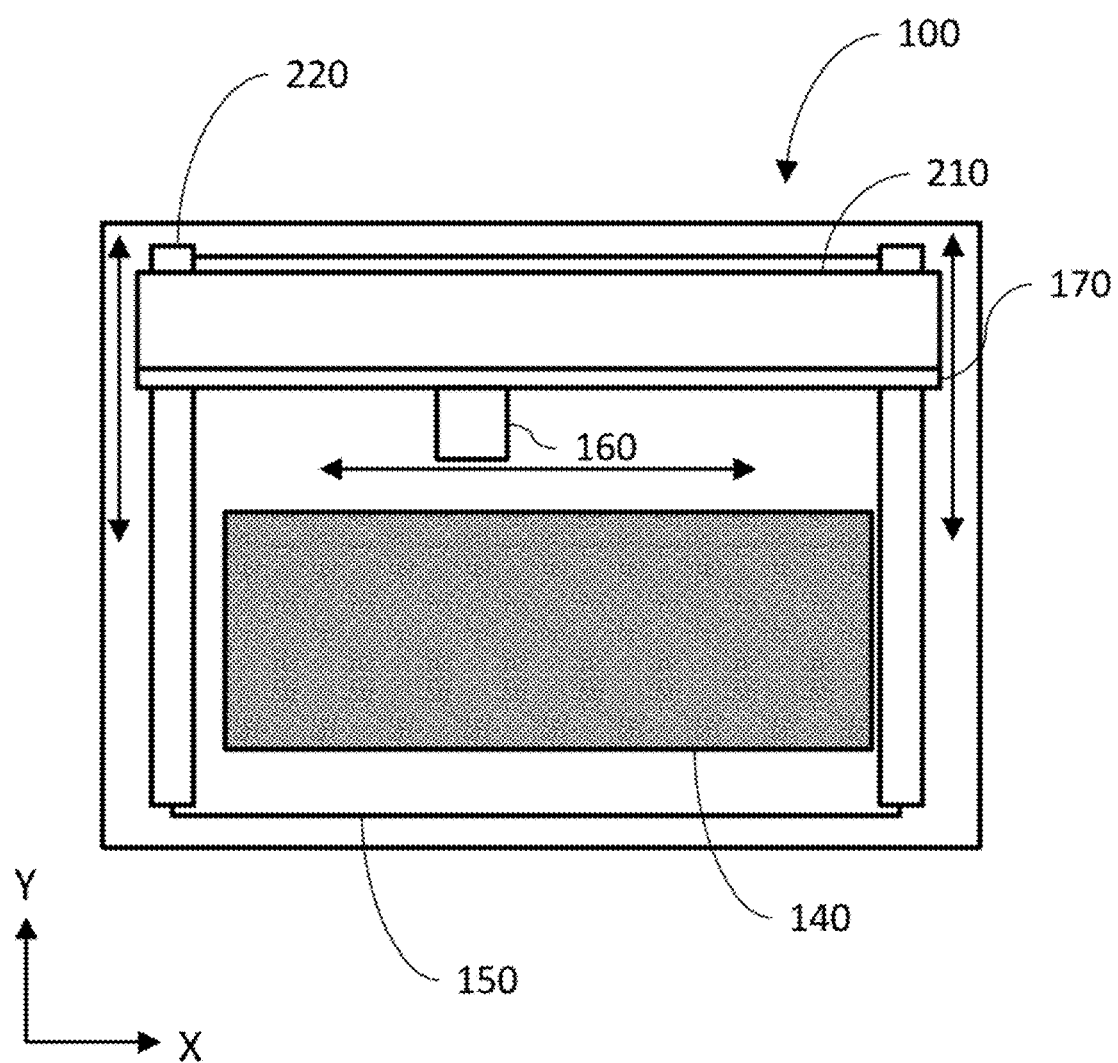
FIG. 2 depicts a top view of an example of a computer numerically controlled machine consistent with implementations of the current subject matter.

FIG. 1 depicts an elevational view of an example of a computer numerically controlled machine 100, consistent with implementations of the current subject matter. The example of the computer numerically controlled machine 100 show in FIG. 1 may include a camera positioned to capture an image of an entire material bed 150 and another camera positioned to capture an image of a portion of the material bed 150, consistent with some implementations of the current subject matter. FIG. 2 depicts a top view of the example of the computer numerically controlled machine 100 shown in FIG. 1.

In some implementations of the current subject matter, the computer numerically controlled machine 100 may be a laser cutter/engraver that uses electromagnetic energy (e.g., laser) to perform various forms of subtractive processing including, for example, cutting, engraving, and/or the like. While some features are described herein in the context of a laser cutter, this is by no means intended to be limiting. Many of the features described below can be implemented with other types of computer numerically controlled machines.

As a laser cutter/engraver, the computer numerically controlled machine 100 may be subject to particularly challenging design constraints. For example, a laser cutter/engraver is subject to regulatory guidelines that restrict the egress of electromagnetic energy from the unit when operating, making it challenging for light to enter or escape the unit safely, for example to view or record an image of the contents. The beam of a laser cutter/engraver must be routed from the emitter to the area to be machined, potentially requiring a series of optical elements such as lenses and mirrors. The beam of a laser cutter/engraver is easily misdirected, with a small angular deflection of any component relating to the beam path potentially resulting in the beam escaping the intended path, potentially with undesirable consequences. A laser beam may be capable of causing material destruction if uncontrolled. A laser cutter/engraver may require high voltage and/or radio frequency power supplies to drive the laser itself.

Liquid cooling is common in laser cutter/engravers to cool the laser, requiring fluid flow considerations. Airflow is important in laser cutter/engraver designs, as air may become contaminated with byproducts of the laser's interaction with the material such as smoke, which may in turn damage portions of the machine for example fouling optical systems. The air exhausted from the machine may contain undesirable byproducts such as, for example, smoke that must be routed or filtered, and the machine may need to be designed to prevent such byproducts from escaping through an unintended opening, for example by sealing components that may be opened. Unlike most machining tools, the kerf—the amount of material removed during the operation—is both small and variable depending on the material being processed, the power of the laser, the speed of the laser, and other factors, making it difficult to predict the final size of the object.

Also unlike most machining tools, the output of the laser cutter/engraver is very highly dependent on the speed of operation; a momentary slowing can destroy the workpiece by depositing too much laser energy. In many machining tools, operating parameters such as tool rotational speed and volume of material removed are easy to continuously predict, measure, and calculate, while laser cutter/engravers are more sensitive to material and other conditions. In many machining tools, fluids are used as coolant and lubricant; in laser cutter/engravers, the cutting mechanism does not require physical contact with the material being affected, and air or other gasses may be used to aid the cutting process in a different manner, by facilitating combustion or clearing debris, for example.

Referring again to FIG. 1, the computer numerically controlled machine 100 can have a housing surrounding an enclosure or interior area defined by the housing. The housing can include walls, a bottom, and one or more openings to allow access to the computer numerically controlled machine 100. In addition, the material bed 150 may be disposed at least partially within the housing of the computer numerically controlled machine 100 and may include a top surface on which the material 140 generally rests.

In the example of the computer numerically controlled machine 100 shown in FIG. 1, the computer numerically controlled machine 100 can also include an openable barrier as part of the housing to allow access between an exterior of the computer numerically controlled machine and an interior space of the computer numerically controlled machine. The openable barrier can include, for example, one or more doors, hatches, flaps, lids, and the like that can actuate between an open position and a closed position. The openable barrier can attenuate the transmission of light between the interior space and the exterior when in a closed position. Optionally, the openable barrier can be transparent to one or more wavelengths of light or be comprised of portions of varying light attenuation ability. One type of openable barrier can be a lid 130 that can be opened or closed to put material 140 on the material bed 150 on the bottom of the enclosure.

Various example implementations discussed herein include reference to a lid. It will be understood that absent explicit disclaimers of other possible configurations of the operable barrier or some other reason why a lid cannot be interpreted generically to mean any kind of openable barrier, the use of the term lid is not intended to be limiting. One example of an openable barrier can be a front door that is normally vertical when in the closed position and can open horizontally or vertically to allow additional access. There can also be vents, ducts, or other access points to the interior space or to components of the computer numerically controlled machine 100. These access points can be for access to power, air, water, data, etc. Any of these access points can be monitored by cameras, position sensors, switches, etc. If they are accessed unexpectedly, the computer numerically controlled machine 100 can execute actions to maintain the safety of the user and the system, for example, a controlled shutdown. In other implementations, the computer numerically controlled machine 100 can be completely open (i.e. not having a lid 130, or walls). Any of the features described herein can also be present in an open configuration, where applicable.

The computer numerically controlled machine 100 can have one or more heads including, for example, the head 160, which can be operated to alter the material 140. The head 160 may be configured to steer a beam of electromagnetic energy to a desired location on the material 140 positioned in the working area of the computer numerically controlled machine 100. For instance, the head 160 may be mobile including by translating and/or rotating to locate a beam of electromagnetic energy from a source configured to generate and/or emit the electromagnetic energy. Alternatively, the head 160 may be stationary and the beam of electromagnetic energy may be located by translating and/or rotating one or more optical components configured to route the electromagnetic energy from the head 160. It should be appreciated that the computer numerically controlled machine 100 may include multiple heads that operate independently or in unison to locate the beam of electromagnetic energy.

In some implementations of the current subject matter, the head 160 can be configured to include a combination of optical, electronic, and/or mechanical components that can, in response to commands, cause a laser beam or electromagnetic energy to be delivered to cut or engrave the material 140. The source (e.g., an emitter and/or the like) generating the electromagnetic energy may be part of the head 160 or separate from the head 160. The computer numerically controlled machine 100 can also execute operation of a motion plan for causing movement of the head 160 in implementations where the head 160 is configured to be mobile. Electromagnetic energy effecting one or more changes in the material 140 that is at least partially contained within the interior space of the computer numerically controlled machine 100 may therefore be delivered by moving the head 160. In one implementation, the position and orientation of the optical elements inside the head 160 can be varied to adjust the position, angle, or focal point of a laser beam. For example, mirrors can be shifted or rotated, lenses translated, etc. The head 160 can be mounted on a translation rail 170 that is used to move the head 160 throughout the enclosure. In some implementations the motion of the head 160 can be linear, for example on an X axis, a Y axis, or a Z axis. In other implementations, the head 160 can combine motions along any combination of directions in a rectilinear, cylindrical, or spherical coordinate system.

A working area for the computer numerically controlled machine 100 can be defined by the limits within which the head 160, whether stationary or mobile, can cause delivery of a machining action, or delivery of a machining medium, for example electromagnetic energy. The working area can be inside the interior space defined by the housing. It should be understood that the working area can be a generally three-dimensional volume and not a fixed surface. For example, if the range of travel of a vertically oriented laser cutter is a 10"×10" square entirely over the material bed 150, and the laser from the laser beam comes out of the laser cutter at a height of 4" above the material bed of the computer numerically controlled machine, that 400 in$^2$ volume can be considered to be the working area.

The working area can be defined by the extents of positions in which material 140 can be worked by the computer numerically controlled machine 100. As such, the boundaries of the working area may not necessarily be defined or limited by the range of travel of any one component. For example, if the head 160 could turn at an angle, then the working area could extend in some direction beyond the travel of the head 160. By this definition, the working area can also include any surface, or portion thereof, of any material 140 placed in the computer numerically controlled machine 100 that is at least partially within the working area, if that surface can be worked by the computer numerically controlled machine 100. Similarly, for oversized material, which may extend even outside the computer numerically controlled machine 100, only part of the material 140 might be in the working area at any one time.

The translation rail 170 can be any sort of translating mechanism that enables movement of the head 160 in the X-Y direction, for example a single rail with a motor that slides the head 160 along the translation rail 170, a combination of two rails that move the head 160, a combination of circular plates and rails, a robotic arm with joints, etc.

Components of the computer numerically controlled machine 100 can be substantially enclosed in a case or other enclosure. The case can include, for example, windows, apertures, flanges, footings, vents, etc. The case can also contain, for example, a laser, the head 160, optical turning systems, cameras, the material bed 150, etc. To manufacture the case, or any of its constituent parts, an injection-molding process can be performed. The injection-molding process can be performed to create a rigid case in a number of designs. The injection molding process may utilize materials with useful properties, such as strengthening additives that enable the injection molded case to retain its shape when heated, or absorptive or reflective elements, coated on the surface or dispersed throughout the material for example, that dissipate or shield the case from laser energy. As an example, one design for the case can include a horizontal slot in the front of the case and a corresponding horizontal slot in the rear of the case. These slots can allow oversized material to be passed through the computer numerically controlled machine 100.

Optionally, there can be an interlock system that interfaces with, for example, the openable barrier, the lid 130, door, and the like. Such an interlock is required by many regulatory regimes under many circumstances. The interlock can then detect a state of opening of the openable barrier, for example, whether a lid 130 is open or closed. In some implementations, an interlock can prevent some or all functions of the computer numerically controlled machine 100 while an openable barrier, for example the lid 130, is in the open state (e.g. not in a closed state). The reverse can be true as well, meaning that some functions of the computer numerically controlled machine 100 can be prevented while in a closed state. There can also be interlocks in series where, for example, the computer numerically controlled machine 100 will not operate unless both the lid 130 and the front door are both closed. Furthermore, some components of the computer numerically controlled machine 100 can be tied to states of other components of the computer numerically controlled machine, such as not allowing the lid 130 to open while the laser is on, a movable component moving, a motor running, sensors detecting a certain gas, etc. In some implementations, the interlock can prevent emission of electromagnetic energy from the head 160 when detecting that the lid 130 is not in the closed position.

The computer numerically controlled machine 100 may undergo various calibrations, alignments, and/or optimizations in order to ensure that the computer numerically controlled machine 100 operates properly. Calibrating, aligning, and/or optimizing the computer numerically controlled machine 100 may include determining one or more characteristics of a surface within the interior space of the computer numerically controlled machine 100. The computer numerically controlled machine 100 may be calibrated, aligned, and/or optimized based on, for example, a size of the material, a distance to the surface of the material, a height of at least one surface of the material, a thickness of the material, an angle of the surface of the material, one or more edges of the material, one or more surface properties of the material (e.g., absorptivity), a presence of jigs, a presence of fiducial alignment markers, a presence of one or more patterns encoding data (e.g., barcode), visual designs on the surface of the material that are intended for reproduction, and/or the like. Examples of various surfaces that may be present within the interior space of the computer numerically controlled machine 100 may include the material 140, a fixture or a component of the computer numerically controlled machine 100 (e.g., the material bed 150, the interior walls of the housing of the computer numerically controlled machine 100, and/or the like), and a feature within the computer numerically controlled machine 100 (e.g., an area formed from a different material or containing a mark).

In some implementations of the current subject matter, structured light may be projected on at least a portion of a surface within the interior space of a computer numerically controlled machine 100 in order to determine one or more characteristics of the surface including, for example, a size of the material, a distance to the surface of the material, a height of at least one surface of the material, a thickness of the material, an angle of the surface of the material, one or more edges of the material, one or more surface properties of the material (e.g., absorptivity), a presence of jigs, a presence of fiducial alignment markers, a presence of one or more patterns encoding data (e.g., barcode), visual designs on the surface of the material that are intended for reproduction, and/or the like. The structured light may include multiple dots of light forming a pattern such as, for example, a grid, crisscross lines, and/or the like. Moreover, the structured light may be generated by a variety of light sources including, for example, non-laser sources (e.g., light emitting diodes (LEDs) and/or the like), laser light source (e.g., a Vertical-Cavity Surface Emitting Laser (VCSEL) array), and/or the like.

As noted, to accurately measure the material 140 such that the material 140 may be processed to achieve the intended final appearance of the material 140, the computer numerically controlled machine 100 may be calibrated, aligned, and/or optimized based on the structured light projected on one or more surfaces within the computer numerically controlled machine 100. The calibration, alignment, and optimization may include determining calibration data that accounts for manufacturing defects as well as configuration variations at the computer numerically controlled machine 100 such as, for example, the addition and/or removal of physical components (e.g., material tray, rotary adaptor, and/or the like). Measurements of the material 140 may be performed based on the calibration data in order to eliminate errors associated with manufacturing defects and/or configuration variations at the computer numerically controlled machine 100.

In some implementations of the current subject matter, the thickness of the material 140 may corresponding to a difference between a first height of the surface of the material 140 and a second height of a substrate that the material 140 is resting upon. The substrate may form at least a portion of the material bed 150 upon which the material 140 is resting with or without an additional securing or affixing mechanism. The substrate may be a flat surface (e.g., a plate and/or the like) or may include one or more surface features such as grids, rails, pins, and/or the like. In some cases the material 140 may lay flat against the substrate, in which case the distance between the bottom of the material 140 and the top of the substrate may be minimal. However, there may be instances where the material 140 does not lay flat against the substrate, for example, due to warpage in one or more portions of the material 140. In that case, the height of the material 140 may be higher than if the material 140 is resting directly atop the substrate. As such, it should be appreciated that the height of the material 140 may vary depending on the distance between the material 140 and the substrate.

The first height of the material 140 and the second height of the substrate may be measured directly, for example, by projecting and measuring structured light. However, in instances where the substrate is difficult to image (e.g., a black substrate that absorbs the structured light), a layer of additional material (e.g., a conforming material such as paper and/or the like) may be disposed on the surface of the substrate such that measurements may be taken from the structured light that is projected onto the additional material instead. It should be appreciated that the thickness of this additional layer of material, if known, may be further subtracted from the second height of the substrate.

In some cases, a piece of the material 140 may be cut from the material 140, for example, as part of the fabrication process. If the material 140 is resting above the substrate, for example, if portions of the material 140 arches upwards away from the substrate instead of being in direct contact with the surface of the substrate, the piece that is cut from the material 140 may drop until it is in contact with the substrate. The distance between a bottom surface of the material 140 and a top surface of the substrate (e.g., the gap between these two surfaces) may be determined by measuring the first height of the material 140 (e.g., prior to the cut) and subtracting the height of the cut portion of the material 140.

In some implementations of the current subject matter, the structured light may be used to detect one or more edges on the material 140 (or another surface within the computer numerically controlled machine 100). For example, edge detection may include detecting a transition from a presence of the material 140 to an absence of the material 140. Edge detection may be performed in order to determine whether the processing (e.g., cutting, engraving, and/or the like) to be performed on the material 140 exceeds one or more edges of the material 140. If it is determined that the processing to be performed on the material 140 exceeds one or more edges of the material 140, an alert may be raised to notify a user and/or the design may be automatically re-positioned such that the processing of the material 140 will no longer exceed the one or more edges of the material. Alternatively and/or additionally, edge detection may be performed in order to realign the material 140 and perform additional processing of the material 140.

In some implementations of the current subject matter, multipoint autofocus may be performed to ensure that a consistent quantity of electromagnetic energy is delivered to the material 140 (e.g., by the head 160) even when the material 140 exhibits variations in thickness (and/or height). Multipoint autofocus may be performed based on a height map generated, for example, by projecting and measuring structured light on the surface of the material 140. For example, as a focus lens (and/or another component for focusing the electromagnetic energy) is moved across the material 140, the height of the focus lens may be adjusted to maintain a constant distance between the focus lens and the surface of the material 140. Doing so may change the focus of the electromagnetic energy, thereby ensuring that variations in the height (and/or thickness) of the material 140 do not give rise to variations in the quantity of electromagnetic energy delivered to the material 140. In some cases, multipoint autofocus may be combined with edge detection to further ensure that the delivery of the electromagnetic energy ceases beyond the one or more edges of the material 140.

In some implementations of the current subject matter, the computer numerically controlled machine 100 may include one or more sensors configured to detect the structured light that is projected onto the surface within the interior space of the computer numerically controlled machine 100. For example, the structured light that is projected onto the surface of the material 140 within the interior space of the computer numerically controlled machine 100 may be detected by a single stationary camera mounted to the openable barrier (e.g., the lid 130) of the computer numerically controlled machine 100. The camera may be configured to generate one or more images, each of which capturing at least a portion of or substantially an entirety of the material 140, the material bed 150, and/or the working area of the computer numerically controlled machine 100. As such, the camera may be configured to generate each of the one or more images to capture substantially an entirety of the surface of the material 140 and/or the structured light that is projected on the surface of the material 140.

For example, in one implementation of the current subject matter, the structured light may be projected on substantially an entirety of the surface of the material 140 while the images generated by the camera may capture substantially the entirety of the surface of the material 140 including the structured light. Alternatively, the structured light may be projected on one or more portions of the surface of the material 140. Moreover, the images generated by the camera may capture portions of the surface of the material 140. One or more characteristics of the surface of the material 140 may be determined based on the one or more images, which capture portions or all of the surface of the material 140.

In some implementations of the current subject matter, some or all of the material 140 may be transparent and/or semi-transparent, in which case a refractive index of the material 140 may be used to evaluate how the material 140 responds to the structured light that is projected on the surface of the material 140. The refractive index of the material 140 may be determined, for example, by lookup (e.g., based on a barcode associated with the material 140) and/or based on user input. Alternatively and/or additionally, the refractive index may be measured at the computer numerically controlled machine 100, for example, by the one or more sensors 310. In this case, the refractive index of the material 140 may be determined by analyzing one or more images of a pattern (e.g., a grid and/or the like) placed beneath the material 140. For example, the refractive index of the material 140 may be determined based at least on the distortion that is present in the pattern imaged through the material 140.

Figure 3A:
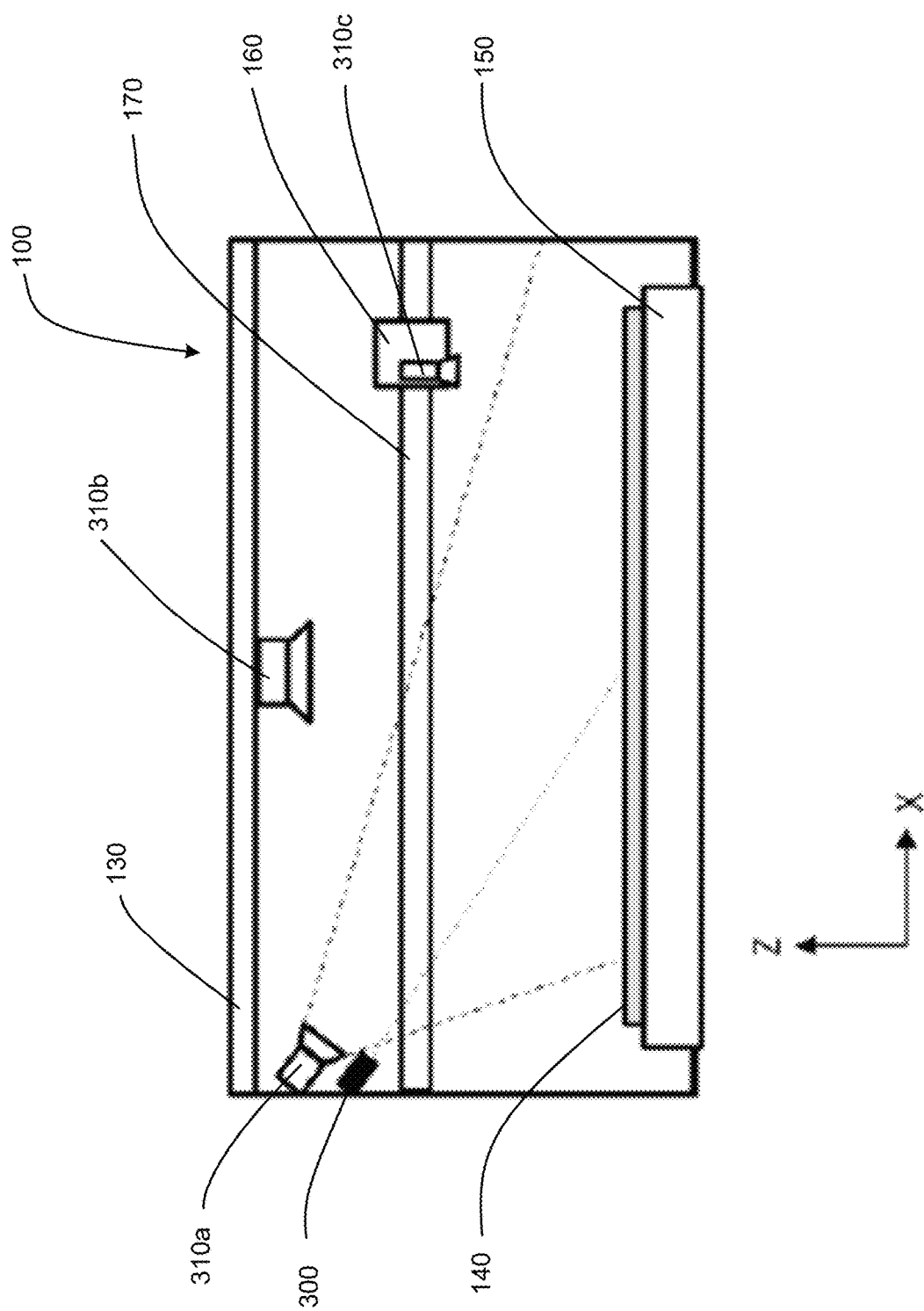
FIG. 3A depicts a transparent side view of an example of a computer numerically controlled machine consistent with implementations of the current subject matter.

To further illustrate, FIG. 3A depicts a transparent side view of an example of the computer numerically controlled machine 100 consistent with implementations of the current subject matter. The computer numerically controlled machine 100 may, as noted, include one or more light sources configured to generate the structured light that is projected onto one or more surfaces within the interior space of the computer numerically controlled machine 100. In the example of the computer numerically controlled machine 100 shown in FIG. 3A, the computer numerically controlled machine 100 may include a light source 300 and one or more sensors 310. The light source 300 may be stationary, for example, by being mounted to a fixed location within the computer numerically controlled machine 100. Alternatively, the light source 300 may be mobile, for example, by being coupled with the translation rail 170 such that the light source 300 may be moved throughout at least a portion of the interior space of the computer numerically controlled machine 100. The light source 300 may also include multiple light sources mounted at different locations and/or different orientations to project structured light on various surfaces within the interior space of the computer numerically controlled machine 100.

The light source 300 may be a non-laser light source such as, for example, light emitting diodes (LEDs) and/or the like. Alternatively, the light source 300 may be a laser light source (e.g., a Vertical-Cavity Surface Emitting Laser (VCSEL) array and/or the like) configured to generate an electromagnetic energy at a wavelength that is detectable by the one or more sensors 310 but having insufficient power to alter a physical appearance of the one or more surfaces within the interior space of the computer numerically controlled machine 100. The light source 300 may be configured to output light that is visible to the human eye (e.g., visible light having wavelengths within the visible light spectrum of approximately 380 to 700 nanometers) and/or light that is invisible to the human eye (e.g., infrared light having wavelengths between approximately 700 nanometers to 1 millimeter). It should be appreciated that the light source 300 may be the same source that is generating the electromagnetic energy delivered by the head 160.

In some implementations of the current subject matter, the light source 300 may also be configured to output light at a wavelength detectable by the one or more sensors 310 and also capable of penetrating a masking material that is present on the material 140. Accordingly, the one or more sensors 310 may be able to generate images of the surface of the material 140 beneath the masking material. These images may be used to generate a preview of the material 140 as well as to detect irregularities that are present on the surface of the material 140 beneath the masking material.

In some implementations of the current subject matter, the one or more sensors 310 may be configured to detect the structured light projected onto the one or more surfaces within the interior space of the computer numerically controlled machine 100. The one or more sensors 310 may be cameras such as, for example, stereoscopic cameras and/or the like. The one or more sensors 310 may include one or more cameras, which may be mounted and/or oriented at a certain angle (e.g., perpendicular or another angle) relative to the material bed 150 and are thus at a known angle relative to the surface of the material 140 disposed on the material bed 150. Alternatively and/or additionally, the one or more sensors 310 may include a single camera with a movable lens configured to perform depth sensing. One or more characteristics of the material 140, such as the height of the material 140, may be determined based on a focus (and/or crispness) of one or more images captured by this camera with its lens at one or more locations.

In some implementations of the current subject matter, the one or more sensors 310 may include one or more cameras configured to capture images from multiple vantage points including, for example, a first image having a first vantage point, a second image having a second vantage point, and/or the like. One or more characteristics of the material 140 may be determined based on a location of one or more common features in each image as well as the location of the cameras capturing the images. For example, stereo vision may be performed in order to extract the distance to the surface of the material 140 from the images at different vantage points. As used herein, the term "stereo vision" refers to a process in which multiple images are analyzed to extract three dimensional information associated, for example, with the material 140.

The light source 300 may be configured to project a visible light (e.g., light having wavelengths within the visible light spectrum of approximately 380 to 700 nanometers). The one or more sensors 310 may thus include a visible light camera capable of capturing structured light that is visible to the human eye. The same camera may capture, for example, a first image of the surface of the material 140 while the light source 300 is not projecting the structured light on the surface of the material 140 as well as a second image of the surface of the material 140 while the light source 300 is projecting the structured light on the surface of the material 140. The first image may be used to generate a graphic user interface (GUI) providing a preview of the material 140. Meanwhile, the second image may be used to determine one or more characteristics of the surface of the material 140 as well as to generate a graphic user interface (GUI) providing a preview of the material 140 in which the characteristics of the surface of the material 140 are identified.

Alternatively and/or additionally, the light source 300 may be configured to project an invisible light (e.g., infrared light having wavelengths between approximately 700 nanometers to 1 millimeter). Accordingly, the one or more sensors 310 may include a camera capable of capturing visible light as well as invisible light (e.g., infrared light). For example, a visible light camera without an infrared filter may be capable of capturing visible light as well as infrared light. The camera may capture a first image of the surface of the material 140, which may be used to generate a graphic user interface (GUI) providing a preview of the material 140. Moreover, the same camera may also capture a second image of the structured light being projected on the surface of the material 140.

In some implementations of the current subject matter, the one or more sensors 310 may be stationary or mobile, for example, by being coupled with the translation rail 170. For example, as shown in FIG. 3A, the one or more sensors 310 may include a first sensor 310a mounted to a side of the computer numerically controlled machine 100, a second sensor 310b mounted on the lid 130 of the computer numerically controlled machine 100, a third sensor 310c mounted to the head 160 of the computer numerically controlled machine 100, and/or the like. The one or more sensors 310 may be cameras configured to generate one or more images, each of which capturing substantially an entirety of the material bed 150 and/or the working area within the computer numerically controlled machine 100.

Figure 3B:
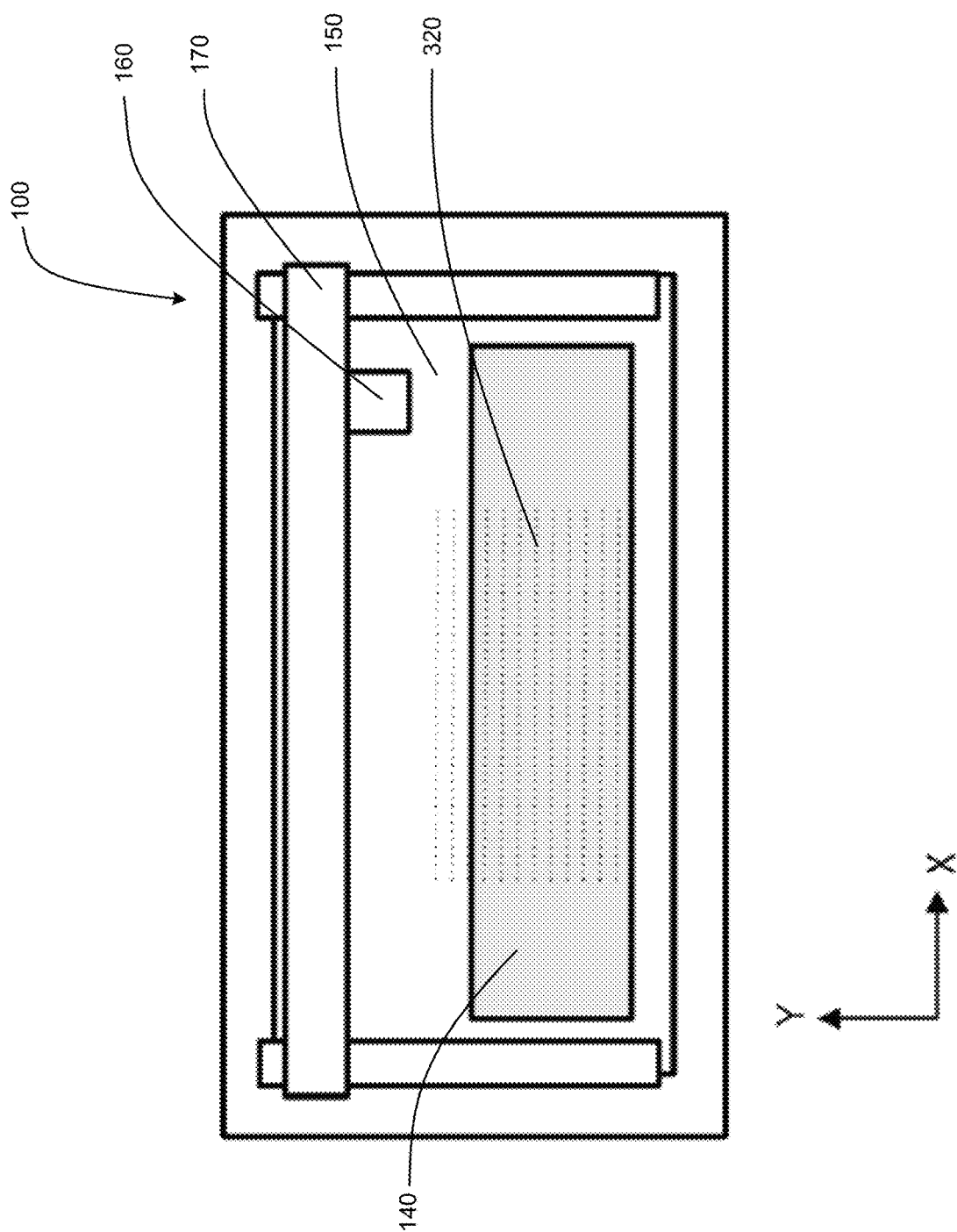
FIG. 3B depicts a transparent top view of an example of a computer numerically controlled machine consistent with implementations of the current subject matter.

The light source 300 may generate structured light that is projected on at least a portion of a surface of the material 140 disposed on the material bed 150. To further illustrate, FIG. 3B depicts a transparent top view of an example of the computer numerically controlled machine 100 consistent with implementations of the current subject matter. As shown in FIG. 3B, the structured light may include multiple dots of light forming a pattern such as, for example, a grid 320 and/or the like, across at least a portion of the surface of the material 140. The one or more sensors 310 may detect the structured light including by generating one or more images, each of which capturing substantially an entirety of the material bed 150 and/or within the working area inside the computer numerically controlled machine 100. For example, the first sensor 310a, the second sensor 310b, and/or the third sensor 310c may generate one or more images that each capture substantially an entirety of the surface of a portion of the material 140 that is disposed on the material bed 150 and/or within the working area inside the computer numerically controlled machine 100. The one or more images may further capture substantially an entirety of the structured light (e.g., the grid 320 and/or the like) projected on the surface of the portion of the material 140 that is disposed on the material bed 150 and/or within the working area inside the computer numerically controlled machine 100.

In some implementations of the current subject matter, one or more characteristics of the surface of the portion of the material 140 disposed on the material bed 150 and/or within the working area inside the computer numerically controlled machine 100 may be determined based at least on the one or more images generated by the sensors 310. For example, the one or more images generated by the sensors 310 may be used to determine a size of the material 140, a distance to the surface of the material 140, a height of at least one surface of the material 140, a thickness of the material 140, an angle of the surface of the material 140, one or more edges of the material 140, one or more surface properties of the material 140 (e.g., absorptivity), a presence of jigs, a presence of fiducial alignment markers, a presence of one or more patterns encoding data (e.g., barcode), visual designs on the surface of the material 140 that are intended for reproduction, and/or the like.

The one or more characteristics of the surface of the material 140 (or another surface) within the interior space of the computer numerically controlled machine 100 may be determined based on a comparison of a reference image of the structured light projected on a reference surface (e.g., a surface having no surface irregularities, a surface having one or more known surface irregularities, and/or the like) to an image of the structured light projected on the surface of the material 140. The image of the surface of the material 140 may include one or more distortions to the structured light that correspond to irregularities that may be present on the surface of the material 140. That is, the irregularities on the surface of the material 140 may distort the structured light that is projected on the surface of the material 140. Accordingly, one or more computations may be performed in order to determine a transform that may be applied to the image of the surface of the material 140 to generate an image matching the reference image. For example, the transform may be applied to the image of the surface of the material 140 to eliminate the one or more distortions corresponding to the irregularities that may be present on the surface of the material 140.

According to some implementations of the current subject matter, the transform may be used to generate a surface map of at least the portion of the material 140 indicating, for example, a size of the material 140, a distance to the surface of the material 140, a height of at least one surface of the material 140, a thickness of the material 140, an angle of the surface of the material 140, one or more edges of the material 140, one or more surface properties of the material 140 (e.g., absorptivity), a presence of jigs, a presence of fiducial alignment markers, a presence of one or more patterns encoding data (e.g., barcode), visual designs on the surface of the material 140 that are intended for reproduction, and/or the like.

Moreover, the computer numerically controlled machine 100 may be calibrated, aligned, and/or optimized based at least on the surface map of the material 140. Examples of calibrations, alignments, and/or optimizations at the computer numerically controlled machine 100 may include adjusting a position and/or an orientation of one or more components delivering the electromagnetic energy (e.g., a height of the head 160), a speed of the one or more components delivering the electromagnetic energy (e.g., the head 160), a position and/or an orientation of the material bed 150, a position and/or an orientation of one or more sensors (e.g., the one or more sensors 310), a power of the electromagnetic energy, and/or the like.

Figure 4A:
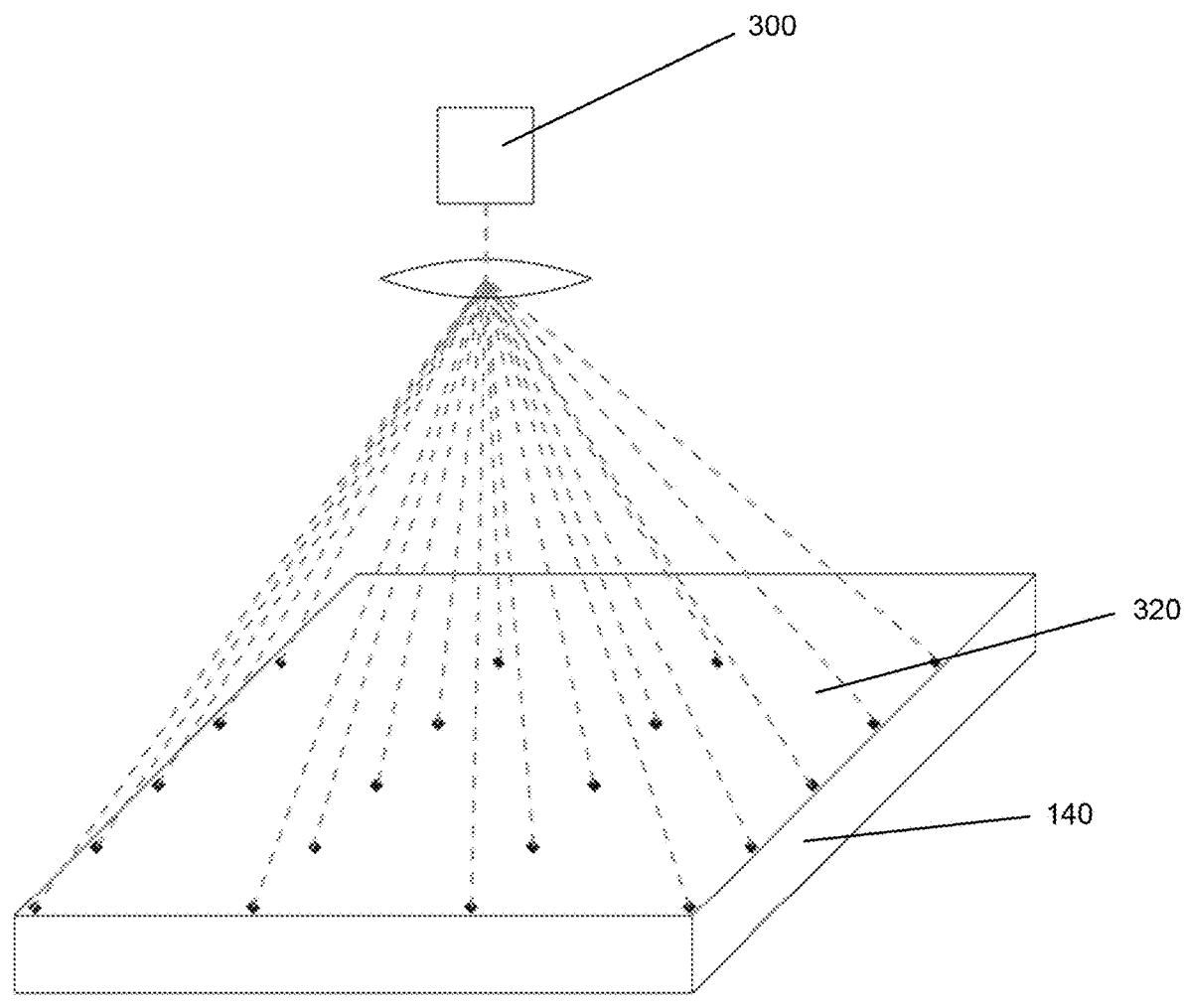
FIG. 4A depicts a schematic diagram illustrating a perspective view of an example of a structured light projected on a surface of a material disposed inside a computer numerically controlled machine.

To further illustrate, FIG. 4A depicts a schematic diagram illustrating a perspective view of an example of structured light projected on a surface of the material 140 disposed inside a computer numerically controlled machine 100. As shown in FIG. 4A, the light source 300 may generate structured light that is projected on at least a portion of the surface of the material 140. The structured light may include multiple dots of light forming a pattern such as, for example, the grid 320 and/or the like, across at least a portion of the surface of the material 140.

Figure 4B:
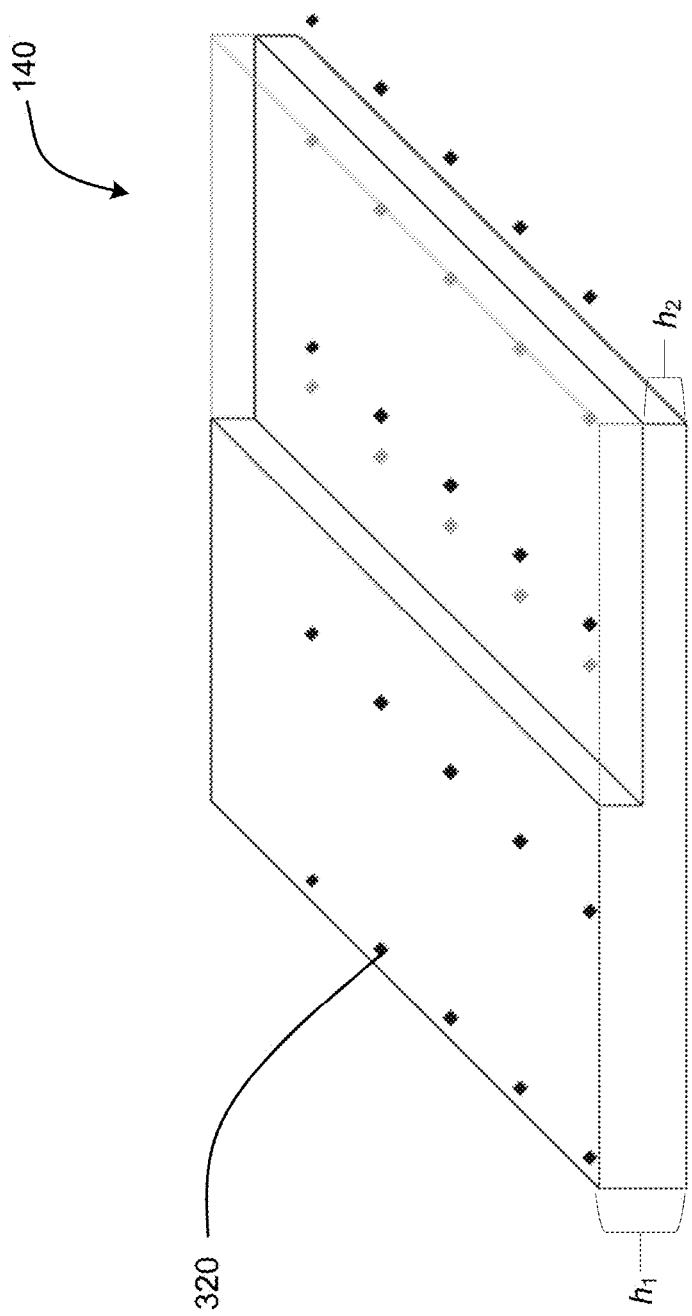
FIG. 4B depicts a schematic diagram illustrating a perspective view of an example of a distortion present in a structured light projected on a surface of a material disposed inside a computer numerically controlled machine.

FIG. 4B depicts a schematic diagram illustrating a perspective view of an example of a distortion present in a structured light projected on the surface of the material 140. The example of the distortion shown in FIG. 4B may be introduced by one or more characteristics of the surface of the material 140 which in this case is a difference in a thickness and/or a height of the material 140. As shown in FIG. 4B, a change in the thickness and/or the height of the material 140, for example, from a first height $h_1$ to a second height $h_2$, may cause a shift or translation in the structured light that is projected onto the surface of the material 140. That is, the structured light that is projected onto the portion of the material 140 having the second height $h_2$ may be shifted to a different location (e.g., to the left in this case) than if the material 140 maintained the same first height $h_1$ throughout.

To illustrate this type of distortion, FIG. 4B includes columns of black dots corresponding to the position of the structured light that is projected onto the material 140 at the first height $h_1$ as well as the second height $h_2$. Where the material 140 transitions to the second height $h_2$, FIG. 4B further includes columns of grey dots indicating the position of the structured light had there been no change in the height or thickness of the material 140. As can be seen in FIG. 4B, the black dots are shifted to the right of the grey dots, which corresponds to the distortion that is introduced by the variation in the height or thickness of the material 140.

In some implementations of the current subject matter, the example of the distortion shown in FIG. 4B may be used to detect one or more edges in the material 140. For example, an edge may be present in the material 140 where the material 140 exhibits a change in height or thickness. Accordingly, one or more edges of the material 140 may be detected by detecting a shift (or translation) in the position of the structured light, for example, one or more dots in the grid 320, projected on the surface of the material 140.

In some implementations of the current subject matter, edge detection may include identifying a first area that is potentially the material 140 and a second area that is potentially the material bed 150 (or another portion of the computer numerically controlled machine). For example, a first sensor (e.g., camera) may be used to identify the first area that is potentially the material 140 (e.g., a sharp color and/or contrast difference is identified, a shape irregularity is identified, etc.). In another example, an indication stored in memory of the processing of a previous design may be used to identify the first area that is potentially the material 140. An edge of the material 140 may correspond to a boundary between the first area and the second area. To verify the presence of the edge, a height map may be referenced (e.g., the height map generated based on one or more measurements of the structured light projected on the surface of the material 140) to determine whether the first area is higher (or thicker) than the second area, for example, by more than a threshold quantity. Alternatively and/or additionally, a difference in the height (and/or thickness) between the first area and second area may be compared to an expected height (and/or thickness) of the material 140. It should be appreciated the expected height and/or thickness of the material 140 may be determined by a variety of means including, for example, by lookup (e.g., based on a barcode associated with the material 140) and/or based on user input.

Figure 4C:
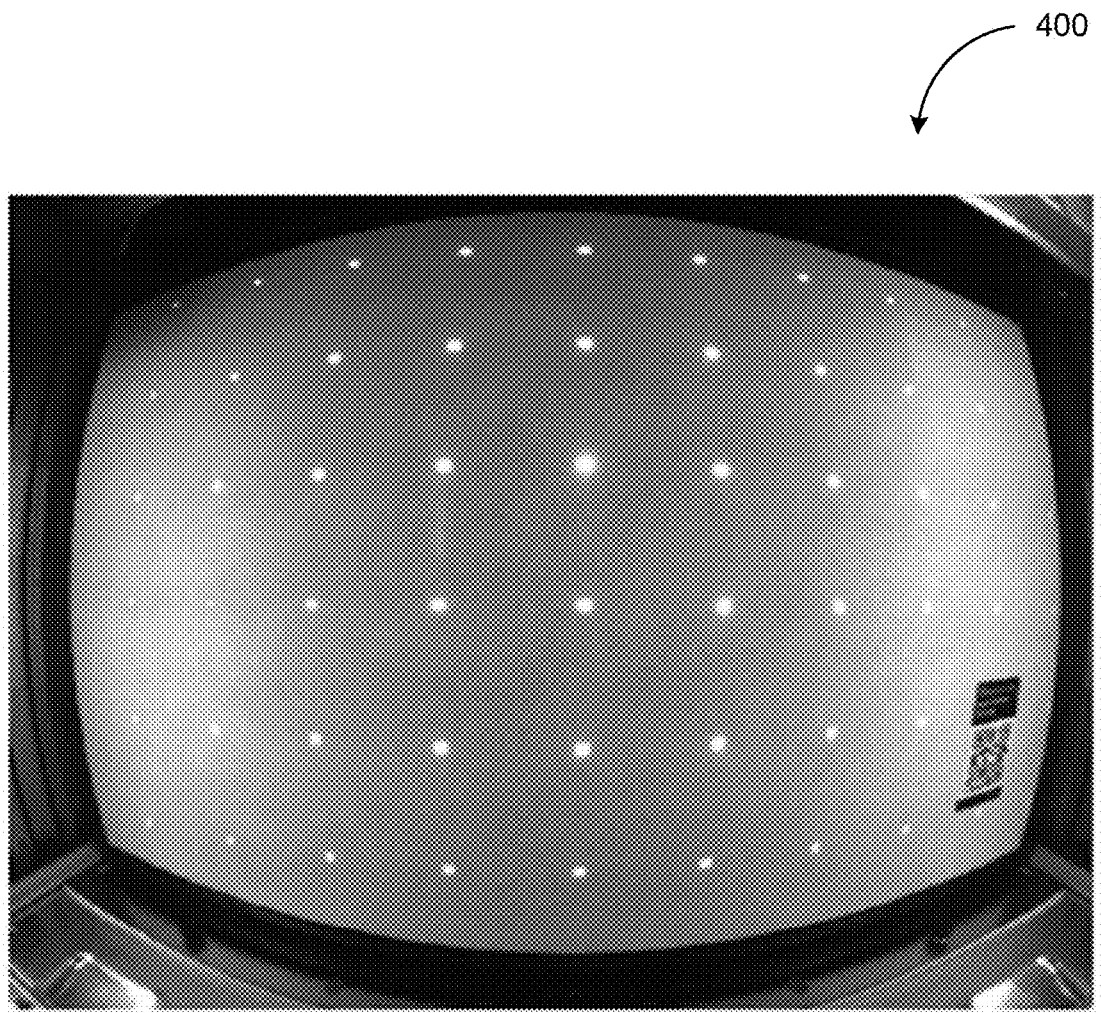
FIG. 4C depicts an example an image of structured light projected on a surface of a material disposed inside a computer numerically controlled machine consistent with implementations of the current subject matter.

FIG. 4C depicts an example of an image 400 of structured light projected on the surface of at least a portion of the material 140 disposed on the material bed 150 and/or within the working area of the computer numerically controlled machine 100. In the example shown in FIG. 4C, the image 400, which may be generated by the one or more sensors 310, may capture at least a portion of or substantially an entirety of the surface of the portion of the material 140 disposed on the material bed 150 and/or within the working area of the computer numerically controlled machine 100. Moreover, as shown in FIG. 4C, the structured light that is projected on the surface of the material 140, for example, by the light source 300, may include multiple dots of light forming a pattern (e.g., a grid and/or the like).

In some implementations of the current subject matter, one or more calibrations may be performed in order to account for distortions associated with the one or more sensors 310. For example, the image 400 shown in FIG. 4C may exhibit an example of optical distortion (e.g., a barrel distortion) that arises when a field of view of the one or more sensors 310 exceeds a size of the image sensor included in the one or more sensors 310. As noted, the one or more sensors 310 may be configured to generate images that capture substantially an entirety of the material bed 150 and/or the working area within the computer numerically controlled machine 100. As such, the one or more sensors 310 may include wide angle lenses, which may give rise to the optical distortion (e.g., the barrel distortion) present in the image 400 when the material 140 is disposed a short distance from the one or more sensors 310 within the interior space of the computer numerically controlled machine 100.

Accordingly, prior to computing a transform that may be applied to the image 400 to generate an image matching a reference image of the structured light projected on one or more known surfaces, one or more calibrations may be performed in order to remove the distortions introduced by the one or more sensors 310. For example, structured light may be projected onto the one or more known surfaces and measurements may be taken where the structured light intersects the known surfaces. The calibration may include comparing the measured results against the expected results and removing the distortions that are detected based on the comparison.

Figure 4D:
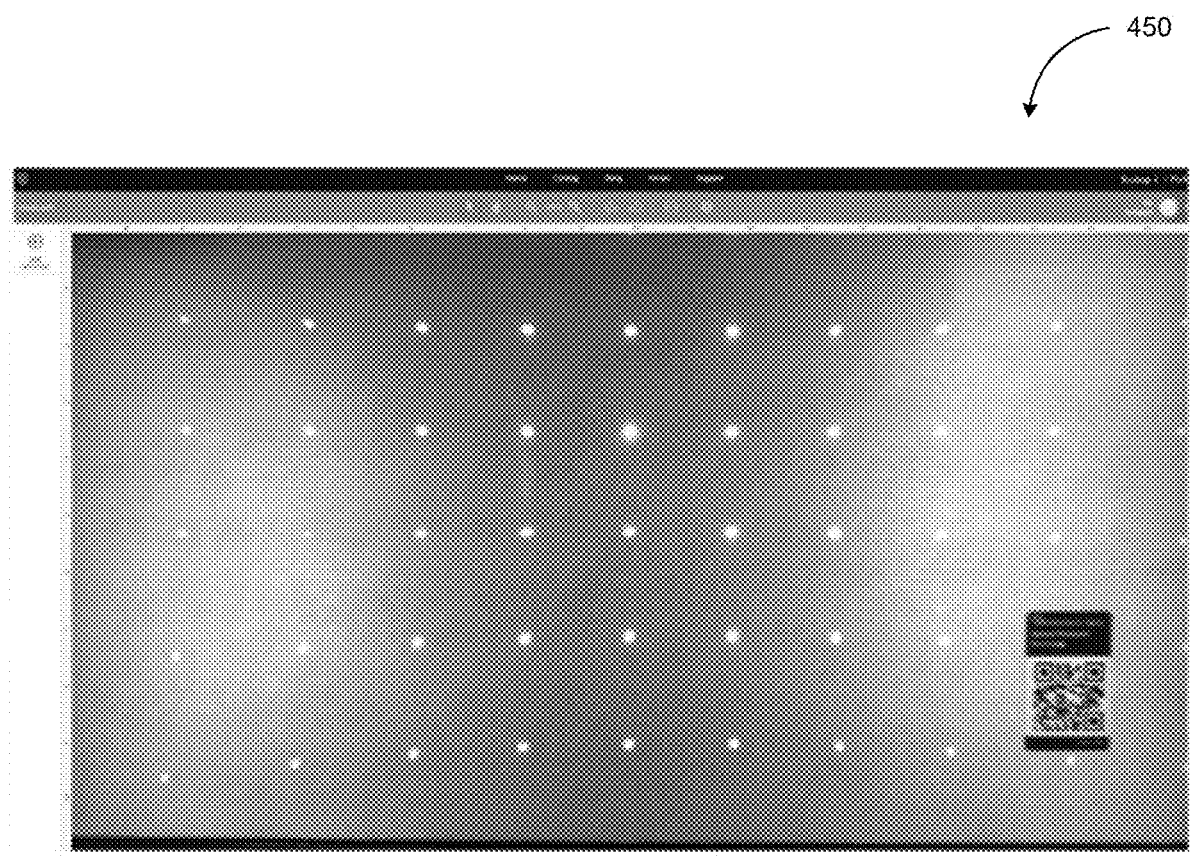
FIG. 4D depicts another example of an image of structured light projected on a surface consistent with implementations of the current subject matter.

FIG. 4D depicts an example of an image 450 in which one or more calibrations have been performed to remove the optical distortions (e.g., the barrel distortion) introduced by the one or more sensors 310. The image 450 may be generated by at least removing the optical distortions introduced by the one or more sensors 310. However, it should be appreciated that distortions associated with the irregularities that are present on the surface of the material 140 may remain in the image 450. As such, one or more computations may be performed subsequent to the calibration in order to determine the transform, which may be applied to the image 450 of the surface of the material 140 to generate an image matching the reference image. Moreover, the transform may be used to generate a surface map of at least the portion of the material 140 indicating, for example, a size of the material 140, a distance to the surface of the material 140, a height of at least one surface of the material 140, a thickness of the material 140, an angle of the surface of the material 140, one or more edges of the material 140, one or more surface properties of the material 140 (e.g., absorptivity), a presence of jigs, a presence of fiducial alignment markers, a presence of one or more patterns encoding data (e.g., barcode), visual designs on the surface of the material 140 that are intended for reproduction, and/or the like. The computer numerically controlled machine 100 may be calibrated, aligned, and/or optimized based at least on the surface map of the material 140. Alternatively and/or additionally, the surface map may be generated subsequent to the processing of the material 140 and used to assess an accuracy of the processing (e.g., whether the depth of the engraving is consistent with an intended design, variability in the power level of the electromagnetic energy delivered to the material 140, and/or the like).

As noted, the light source 300 may be a non-laser light source (light emitting diodes (LEDs) and/or the like) or a laser light source (e.g., a Vertical-Cavity Surface Emitting Laser (VCSEL) array and/or the like) configured to generate an electromagnetic energy at a wavelength that is detectable by the one or more sensors 310 but having insufficient power to alter a physical appearance of the one or more surfaces within the interior space of the computer numerically controlled machine 100. In some implementations of the current subject matter, additional calibrations may be performed in order to compensate for variations in the power of the structured light generated by the light source 300, the absorption property of the surface of the material 140, and/or the like. For example, one or more operating parameters of the light source 300 (e.g., power and/or focus of the electromagnetic energy output by the light source 300) and/or the sensors 310 (e.g., filter, aperture, shutter speed, and/or the like) may be adjusted such that the brightness of the structured light projected on the surface of the material 140 is optimal for being detected by the sensors 310.

Figure 5B:
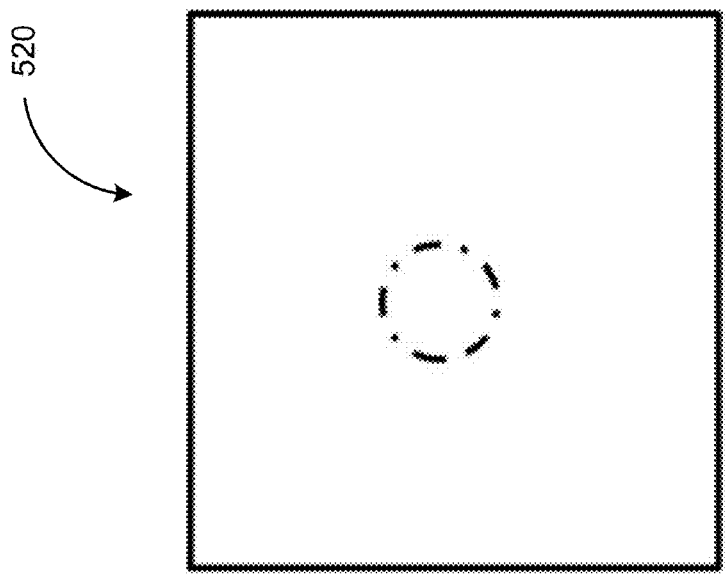
FIG. 5B depicts another example of an image of structured light projected on a surface consistent with implementations of the current subject matter.
Figure 5A:
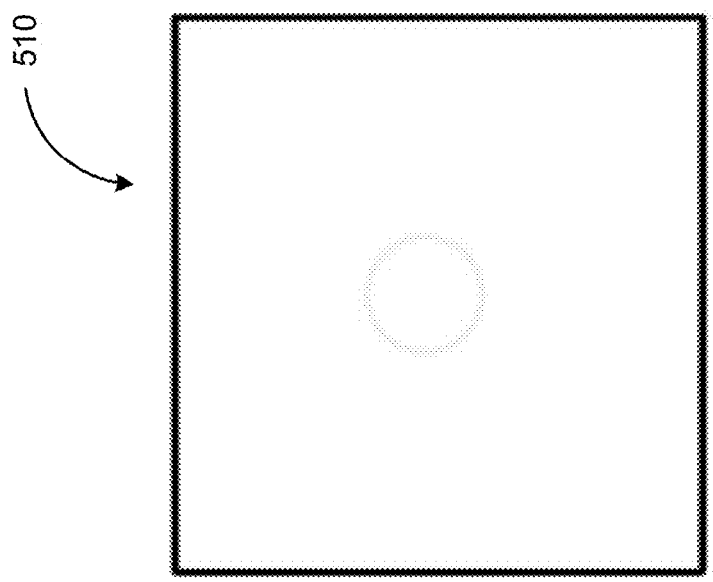
FIG. 5A depicts an example of an image of structured light projected on a surface consistent with implementations of the current subject matter.

To further illustrate, FIGS. 5A-D depicts examples of images of structured light projected, for example, on the surface of the material 140. For example, FIG. 5A depicts an image 510 of a structured light, which may be overexposed and excessively bright due to the light source 300 generating a high power electromagnetic energy. The overexposure of the image 510 may prevent the image 510 from being used to determine one or more characteristics of the surface of the material 140 at least because highlight details (e.g., the bright portions of the image 510) may be absent from the image 510. To avoid the type of overexposure observed in image 510, the power of the electromagnetic energy generated by the light source 300 may be reduced (e.g., to 10% of maximum power and/or the like). However, as shown in FIG. 5B, reducing the power of the electromagnetic energy generated by the light source 300 may still yield an image 520 having insufficient details. The structured light captured in the image 520 may lack the precision necessary for the image 520 to be used to determine one or more characteristics of the surface of the material 140.

Figure 5D:
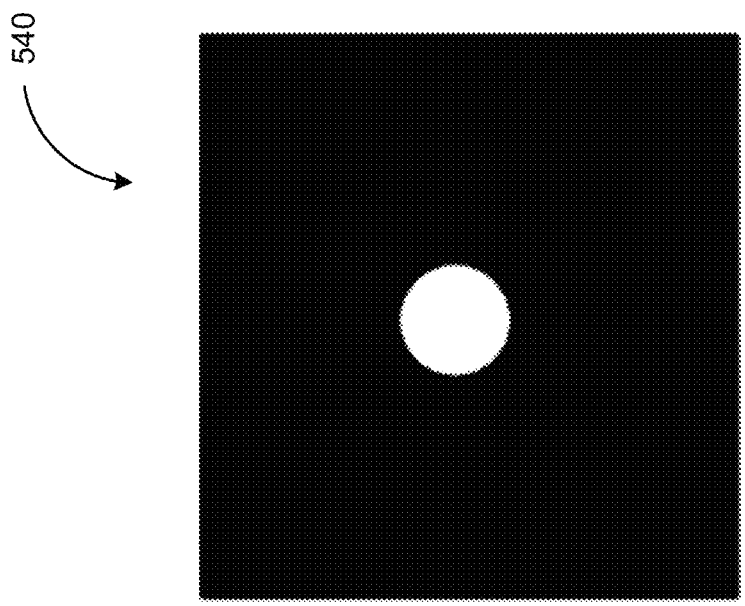
FIG. 5D depicts another example of an image of structured light projected on a surface consistent with implementations of the current subject matter.
Figure 5C:
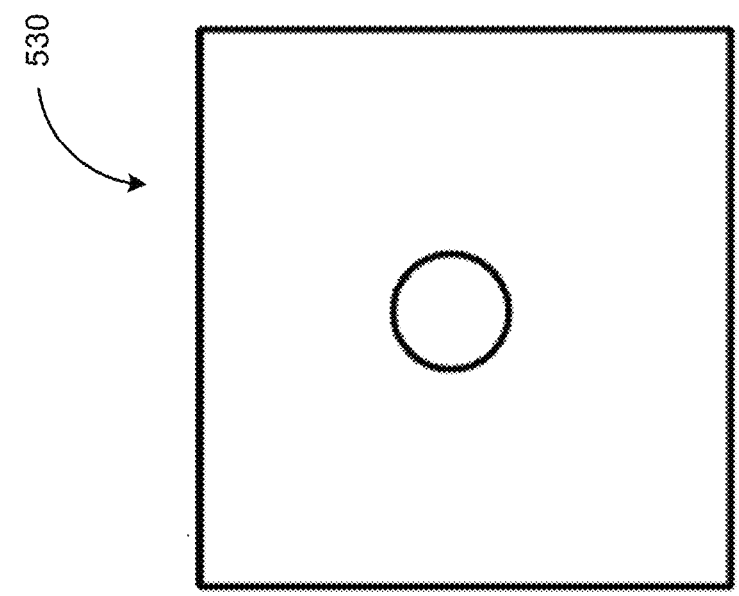
FIG. 5C depicts another example of an image of structured light projected on a surface consistent with implementations of the current subject matter.

In some implementations of the current subject matter, one or more operating parameters of the light source 300 (e.g., power of the electromagnetic energy output by the light source) and/or the sensors 310 (e.g., filter, aperture, shutter speed, and/or the like) may be adjusted in order to compensate for the defects shown in FIGS. 5A-B. To further illustrate, FIG. 5C depicts an example of an image 530 of structured light projected on the surface of the material 140 in which one or more operating parameters of the light source 300 and/or the sensors 310 are altered such that the brightness of the structured light is optimal for being detected by the sensors 310.

To prevent the defects observed in FIGS. 5A-B, the brightness of the structured light projected on the surface of the material 140 may be reduced by at least reducing the power and/or the focus of the electromagnetic energy output by the light source 300. The magnitude of the reduction in the power and/or focus of the electromagnetic energy may be sufficient to avoid the overexposure observed in FIG. 5A without compromising the precision of the resulting structured light. For example, the power and/or the focus of the electromagnetic energy may remain sufficient to project, on the surface of the material 140, a structured light that may be detected by the sensors 310 to generate the image 530 shown in FIG. 5C. As shown in FIG. 5C, the structured light depicted in the image 530 may be sufficiently precise for the image 530 to be used for determining one or more characteristics of the surface of the material 140.

Alternatively and/or additionally, the defects observed in FIGS. 5A-B may be prevented by at least adjusting the operating parameters of the sensors 310. For example, the filter, aperture, and/or shutter speed of the sensors 310 may be adjusted in order to avoid the overexposure observed in FIG. 5A. As such, the image 530 shown in FIG. 5C, which depicts the structured light with sufficient precision for the image 530 to be used for determining one or more characteristics of the surface of the material 140, may also be achieved by adjusting the filter, aperture, and/or shutter speed of the sensors 310.

In some implementations of the current subject matter, the defects observed in FIGS. 5A-B may be further avoided by varying the absorption properties of the surface of the material 140. Moreover, the operating parameters of the light source 300 and/or the sensors 310 may be adjusted based on the absorption properties of the surface of the material 140. For example, the brightness of the structured light may be diminished in instances where the surface of the material 140 absorbs a larger proportion of the electromagnetic energy (e.g., a black colored surface). For example, FIG. 5D depicts an image 540 of a structured light that is projected onto a surface capable of absorbing at least a portion of the electromagnetic energy output by the light source 300. As such, the magnitude of the reduction in the power and/or focus of the electromagnetic energy output by the light source 300 may be smaller in instances where the surface of the material 140 absorbs a larger proportion of the electromagnetic energy. Likewise, the filter, aperture, and/or shutter speed of the sensors 310 may be adjusted based on the proportion of the electromagnetic energy absorbed by the surface of the material 140.

As noted, one or more characteristics of the surface of the material 140 may be determined by projecting a structured light across at least a portion of the surface of the material 140. The structured light may be projected on the surface of the material 140 without altering a physical appearance of the surface of the material 140. However, instead of and/or in addition to projecting the structured light on the surface of the material 140, one or more characteristics of the surface of the material 140 may be determined based on a pattern that is fabricated, engraved, and/or adhered on the surface of the material 140. One or more images of the pattern may be generated (e.g., by the sensors 310) before being compared to reference images of various patterns stored, for example, in a database.

In some implementations of the current subject matter, the pattern that is fabricated, engraved, and/or adhered to the surface of the material 140 may be a way of visually encoding information such as a barcode, in which case one or more images may be used to identify the material 140. For example, the barcode that is disposed on the surface of the material 140 may be identified by matching one or more images of the barcode to reference images of one or more known barcodes, each of which is associated with information for a corresponding material. Accordingly, the material 140 may be identified based at least on the information associated with the matching barcode. For instance, the barcode that is disposed on the material 140 may be matched to a barcode associated information for the material 140 such as a type of the material 140, one or more dimensions of the material 140, recommended motion plans associated with the material 140, and/or the like.

Alternatively and/or additionally, the pattern on the surface of the material 140 may be used to determine one or more characteristics of the surface of the material 140. For example, an image of the surface of the material 140 including the pattern may include one or more distortions corresponding to irregularities that may be present on the surface of the material 140. As such, one or more characteristics of the surface of the material 140 (or another surface) within the interior space of the computer numerically controlled machine 100 may be determined based on a comparison of a reference image of the undistorted pattern to an image of the pattern on the surface of the material 140. One or more computations may be performed in order to determine a transform that may be applied to the image of the surface of the material 140 to generate an image matching the reference image. The transform may be used to generate a surface map of at least the portion of the material 140 indicating, for example, a size of the material 140, a distance to the surface of the material 140, a height of at least one surface of the material 140, a thickness of the material 140, an angle of the surface of the material 140, one or more edges of the material 140, one or more surface properties of the material 140 (e.g., absorptivity), a presence of jigs, a presence of fiducial alignment markers, a presence of one or more patterns encoding data (e.g., barcode), visual designs on the surface of the material 140 that are intended for reproduction, and/or the like. Moreover, the computer numerically controlled machine 100 may be calibrated, aligned, and/or optimized based at least on the surface map of the material 140. The computer numerically controlled machine 100 may also be calibrated, aligned, and/or optimized based on a perimeter of the material 140 if, for example, one or more dimensions of the material 140 are known.

In some implementations of the current subject matter, the calibration, alignment, and/or optimization of the computer numerically controlled machine 100 may include adjusting a focus of the electromagnetic energy delivered by the head 160 to cause one or more changes (e.g., cuts, engravings, and/or the like) in the material 140. The focus of the electromagnetic energy may be adjusted by modifying a position and/or orientation of the head 160 and/or one or more optical elements (e.g., lenses, mirrors, and/or the like) configured to focus the electromagnetic energy. Moreover, the focus of the electromagnetic energy may be adjusted in order to accommodate irregularities on the surface of the material 140 that vary the distance between the surface of the material 140 and the head 160.

As such, in some implementations of the current subject matter, the focus of the electromagnetic energy may be adjusted based on local measurements of one or more characteristics of the surface of the material 140 made during processing of the material 140. These local measurements may be used in addition to and/or instead of information included in the surface map that is generated by projecting the structured light across at least a portion of the surface of the material 140. For instance, in the case of multipoint autofocus, the focus of the electromagnetic energy delivered by the head 160 may be adjusted in order to accommodate variations in the height of the material 140 due to irregularities (e.g., bumps, cracks, cavities, curvatures, ridges, slopes, and/or the like) that are present on the surface of the material 140. That is, one or more local adjustments may be made in order to maintain, between the head 160 and the surface of the material 140, an optimal distance for focusing the electromagnetic energy on the material 140 such that a consistent quantity of electromagnetic energy is delivered to the material 140.

A variety of techniques may be used to perform local measurements of the characteristics of the surface of the material 140 may be made, for example, during the processing of the material 140. For example, in an infrared-based autofocus system, a local measurement of the height of the material 140 may be made by at least determining an offset required to maintain focus of an infrared light projected on the material 140, for example, from an infrared light source included in and/or coupled with the head 160. Focus of the infrared light may be determined based on the brightness of the infrared light projected on the surface of the material 140. As such, the offset required to maintain the focus of the infrared light may be determined by adjusting the position (e.g., height) of the head 160 until the brightness of the infrared light projected onto the surface of the material 140 from the head 160 indicates that the head 160 is at an optimal distance relative to the surface of the material 140. Alternatively, a similar embodiment may be to apply a known or calculated constant or ratio of related elements within the projected data (e.g., black-white color saturation). In an extension to this embodiment, there may be material-dependent corrections applied. In another embodiment, the machine may hunt for focus or to fine-tune focus, by attempting different stepped offsets in various directions.

Alternatively and/or additionally, a local measurement of the height of the material 140 may be determined based on a response of the material 140 to the electromagnetic energy delivered by the head 160. Accordingly, the focus of the electromagnetic energy delivered by the head 160 may be adjusted based on the response of the material 140 to the electromagnetic energy delivered by the head 160. For example, the one or more sensors 310 may include the first sensor 310a, which may be mounted at an angle relative to the path of the electromagnetic energy. The first sensor 310a may thus be configured to generate one or more images of a flame front vaporization zone that is observed when the electromagnetic energy delivered by the head 160 strikes the material 140. Moreover, the one or more images of the flame front vaporization zone may be used to focus the electromagnetic energy including by determining the distance between the head 160 and the material 140 and/or the height of the material 140.

Alternatively and/or additionally, the height of the material 140 may be determined by at least focusing the electromagnetic energy delivered by the head 160 on the surface of the material 140. For example, the electromagnetic energy delivered by the head 160 may form a dot on the surface of the material 140. In order to avoid causing unintentional changes to the material 140, the power of the electromagnetic energy delivered by the head 160 may be reduced such that the dot of electromagnetic energy on the surface of the material 140 may be observed by the sensors 310 but the electromagnetic energy has insufficient power to alter a physical appearance of the material 140.

While the head 160 is delivering electromagnetic energy, the sensors 310 may generate one or more images of the electromagnetic energy, for example, the dot formed by the electromagnetic energy on the surface of the material 140. Moreover, the focus of the electromagnetic energy may be adjusted by at least adjusting the position of the head 160. For example, the head 160 may be raised and/or lowered vertically (e.g., along the Z axis) until the electromagnetic energy is in focus relative to the surface of the material 140. It should be appreciated that the electromagnetic energy may be focused relative to the surface of the material 140 in order to determine the height of the material 140. However, actual processing of the material 140 may require the focus of the electromagnetic energy to be above, at, and/or below the surface of the material 140.

In some implementations of the current subject matter, the focus of the electromagnetic energy may be determined based on the images of the dot of electromagnetic energy captured by the sensors 310. For instance, whether the electromagnetic energy is in focus relative to the surface of the material 140 may be determined based at least on a size of the dot depicted in the images captured by the sensors 310. It should be appreciated that the size of the dot may decrease while the head 160 is being lowered vertically (e.g., along the Z-axis) closer to the surface of the material 140. When the head 160 reaches a distance from the surface of the material 140 at which the electromagnetic energy is in focus, the size of the dot may be at a minimum. However, the size of the dot may begin to increase when the head 160 is lowered beyond the distance at which the electromagnetic energy is in focus.

Accordingly, whether the electromagnetic energy delivered by the head 160 is in focus relative to the surface of the material 140 may be determined by at least observing, in the images captured by the sensors 310, the changes in the size of the dot as the position of the head 160 is adjusted vertically. For example, the distance from the surface of the material 140 at which the electromagnetic energy in focus may correspond to a first distance $d_1$ traveled by the head 160 to achieve a minimum size dot of electromagnetic energy on the surface of the material 140. The first distance $d_1$ may be determined based at least on an observation that a first size $s_1$ of the dot when the head 160 is moved the first distance $d_1$ is less than a second size $s_2$ of the dot when the head 160 moved a second distance $d_2$ farther away from the surface of the material 140 as well as a third size $s_3$ of the dot when the head 160 moved a third distance $d_3$ closer to the surface of the material 140 (e.g., $s_1 < s_2$ and $s_1 < s_3$ while $d_2 > d_1 > d_3$). The height of the material 140 may be determined based at least on the first distance $d_1$ that the head 160 is moved in order for the electromagnetic energy to be in focus relative to the surface of the material 140.

Figure 6:
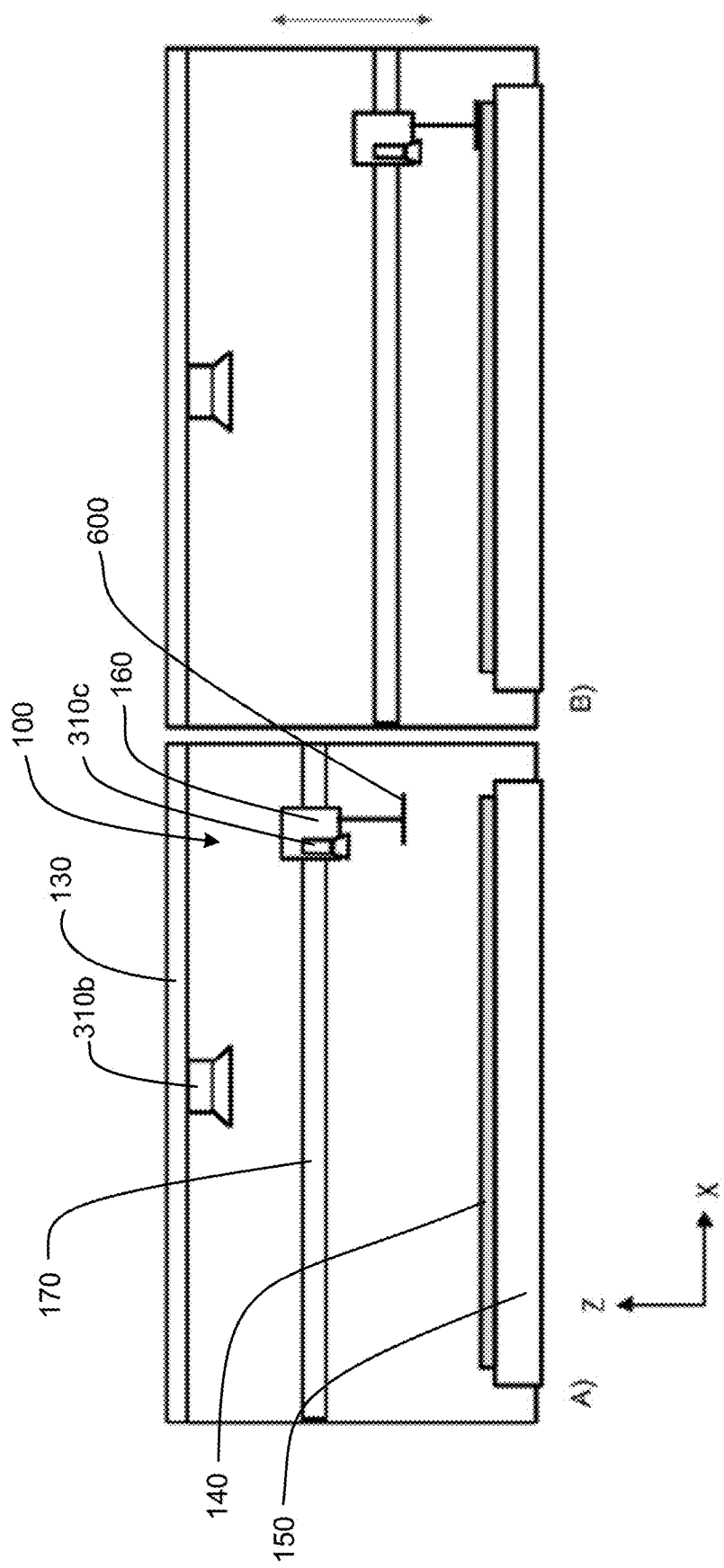
FIG. 6 depicts transparent side view of an example of a computer numerically controlled machine consistent with implementations of the current subject matter.

In some implementations of the current subject matter, one or more local measurements of the characteristics (e.g., height) of the surface of the material 140 may be performed by adjusting the position (e.g., height) of the head 160 delivering the electromagnetic energy. For example, the head 160 of the computer numerically controlled machine 100 may be configured to have a range of motion in the z-axis that extends to a surface of the material 140 and/or the material bed 150. To further illustrate, FIG. 6 depicts transparent side views of another example of the computer numerically controlled machine 100 consistent with implementations of the current subject matter. As noted, the height of the material 140 may be determined based at least on the magnitude of the movement of the head 160 in the z-axis (e.g., the quantity of steps the motor moves the head 160 in the z-axis) and the focus of the electromagnetic energy delivered by the head 160 may be adjusted accordingly. For example, as shown in FIG. 6, the head 160 may be coupled with a sensor 600 configured to measure the height of the material 140 at various locations. The sensor 600 may be, for example, a mechanical touch-off probe (e.g., a plunger with a switch) and the height of the material 140 may be measured and/or inferred via a step counter, an encoder, a potentiometer, and/or the like. Alternatively, the sensor 600 may be, for example, a wire coupled with the head 160 and the height of the material 140 at various locations may be determined based on a response of the wire to the surface of the material 140 including, for example, a magnitude of a force acting on the wire, an angle of the wire, and/or the like.

In some implementations of the current subject matter, a pixel from the one or more sensors 310 (e.g., stereoscopic cameras and/or the like) within the computer numerically controlled machine 100 may be calibrated to a precise location within a rectilinear coordinate system in order to determine a strike location of a beam of electromagnetic energy delivered by the head 160 without altering the appearance of the material 140 disposed in the computer numerically controlled machine 100, for example, on the material bed 150. For example, the power of the electromagnetic energy may be reduced to a level such that the electromagnetic energy striking the surface of the material 140 may be detected by the one or more sensors 310 without altering the appearance of the material 140. That is, the electromagnetic energy may be projected onto the surface of the material 140 at a wavelength detectable by the one or more sensors 310.

The electromagnetic energy in the wavelength detectable by the one or more sensors 310 may be projected, for example, at one or more known locations (e.g., x-y coordinates) within the computer numerically controlled machine 100. Moreover, one or more images of the projections of the electromagnetic energy may be generated by the one or more sensors 310. A relationship between one or more pixels of the sensors 310 and locations within the computer numerically controlled machine 100 may be established based at least on the images of the projections of the electromagnetic energy. This relationship may compensate for imprecisions in the position and/or orientation of the one or more sensors 310 (e.g., the first sensor 310a, the second sensor 310b, and/or the third sensor 310c) mounted within the computer numerically controlled machine 100.

In some implementations of the current subject matter, the strike location of the electromagnetic energy may be determined based at least on the relationship between the pixels of the sensors 310 and various locations within the computer numerically controlled machine 100. For example, the strike location of the electromagnetic energy may be mapped to one or more corresponding pixels of the sensors 310. The relationship between strike location of the electromagnetic energy and the pixels of the sensors 310 may be used to align the electromagnetic energy delivered by the head 160, for example, during the processing of the material 140.

In some implementations of the current subject matter, a surface map of the surface of the material 140 may be generated by at least translating the electromagnetic energy delivered by the head 160 on the surface of the material 140. For example, the head 160 and/or one or more optical elements delivering the electromagnetic energy may be translated in order to project, at various locations on the surface of the material 140, the electromagnetic energy at a reduced power level that is detectable by the one or more sensors 310 but incapable of causing changes to the appearance of the material 140. Moreover, the sensors 310 may generate one or more images of the electromagnetic energy projected on the surface of the material 140. For instance, the sensors 310 may generate a first image of the electromagnetic energy projected at a first location on the surface of the material 140 and a second image of the electromagnetic energy projected at a second location on the surface of the material 140. The first location and the second location may be locations of interest determined based at least on user input, a random sampling, machine vision data, historical data, and/or the like. Moreover, the first image and the second image may be used, respectively, to determine one or more characteristics of the surface of the material 140 at the first location and the second location. Examples of the one or more characteristics may include a size of the material 140, a distance to the surface of the material 140, a height of at least one surface of the material 140, a thickness of the material 140, an angle of the surface of the material 140, one or more edges of the material 140, one or more surface properties of the material 140 (e.g., absorptivity), a presence of jigs, a presence of fiducial alignment markers, a presence of one or more patterns encoding data (e.g., barcode), visual designs on the surface of the material 140 that are intended for reproduction, and/or the like.

In some implementations of the current subject matter, a surface map of the surface of the material 140 may be generated based at least on the first image and the second image. The surface map may be used to calibrate, align, and/or optimize the computer numerically controlled machine 100. Alternatively and/or additionally, the generation of the surface map and the processing of the material 140 may be performed in parallel. For example, while the head 160 and/or the optical elements are configured to deliver the electromagnetic energy to the first location, the power of the electromagnetic energy may be adjusted to a first level at which the electromagnetic energy is detectable by the sensors 310 but incapable of altering the appearance of the material 140. Upon generating one or more images of the electromagnetic energy projected at the first location, for example, to determine the characteristics of the surface of the material 140 at the first location, the material 140 may be processed at the first location by at least increasing the power of the electromagnetic energy to a second level sufficient to cause a change in the appearance of the material 140.

In some implementations of the current subject matter, the power of the electromagnetic energy delivered by the head 160 may be determined based on one or more images of the electromagnetic energy generated, for example, by the sensors 310. A loss in the power of the electromagnetic energy over time may be detected based at least on the images of the electromagnetic energy delivered by the head 160 including images of the electromagnetic energy delivered at different times and/or at different power levels. One or more actions may be performed in response to detecting the loss of power including, for example, adjustments to the power of the electromagnetic energy, replacement of one or more components emitting and/or delivering the electromagnetic energy, user alerts, and/or the like. One or more notifications warning users of a defective component and/or the loss of power as well as recommending various corrective actions may also be generated, for example, at the computer numerically controlled machine 100 and/or the computer 710.

As noted, the one or more images may include images of the electromagnetic energy delivered at different times. For example, the one or more sensors 310 may generate at least a first image of the electromagnetic energy delivered at a first time and at least a second image of the electromagnetic image delivered at a second time. Alternatively and/or additionally, the one or more images may include images of the electromagnetic energy delivered at different power levels. For instance, the one or more sensors 310 may generate a first image of the electromagnetic energy delivered at a first power level and a second image of the electromagnetic energy delivered at a higher second power level.

The electromagnetic energy at neither the first power level nor the second power level may be sufficient to alter the appearance of a material (e.g., the material 140) disposed within the computer numerically controlled machine 100. However, the actual power of the electromagnetic energy when the computer numerically controlled machine 100 is operating at higher power levels may be extrapolated based at least on the first image of the electromagnetic energy delivered at the first power level and the second image of the electromagnetic energy delivered at the second power level. For example, a calibration curve may be determined based at least on an actual power of the electromagnetic energy delivered by the head 160 when the computer numerically controlled machine 100 is operating at the first power level and the second power level. A loss in the power of the electromagnetic energy delivered by the head 160 may be detected based at least on one or more extrapolations performed using the calibration curve.

Figure 7:
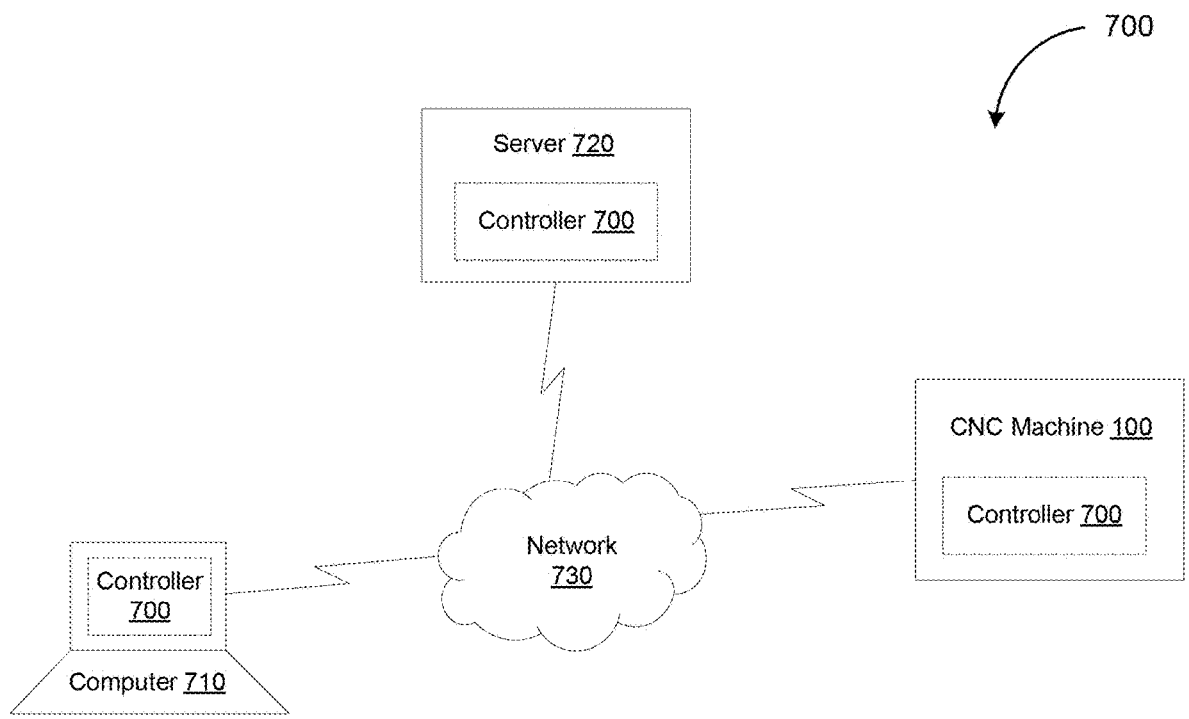
FIG. 7 depicts a system diagram illustrating an example of a computer numerically controlled processing system consistent with implementations of the current subject matter.

FIG. 7 depicts a block diagram illustrating an example of a computer numerically controlled processing system 700 consistent with implementations of the current subject matter. Referring to FIGS. 1-2, 3A-B, 4A-D, 5A-D, and 6-7, the computer numerically controlled processing system 700 may include the computer numerically controlled machine 100 and a controller 700. As shown in FIG. 7, the controller 700 may be deployed locally at the computer numerically controlled machine 100. Alternatively and/or additionally, the controller 700 may be deployed remotely, for example, at a computer 710 and/or a server 720 communicatively coupled with the computer numerically controlled machine 100. For example, as shown in FIG. 7, the computer numerically controlled machine 100 may be communicatively coupled with the computer 710 and/or the server 720 via a network 730. The network 730 may be a wired network and/or a wireless network including, for example, a local area network (LAN), a virtual local area network (VLAN), a wide area network (WAN), a public land mobile network (PLMN), the Internet, and/or the like.

Figure 8:
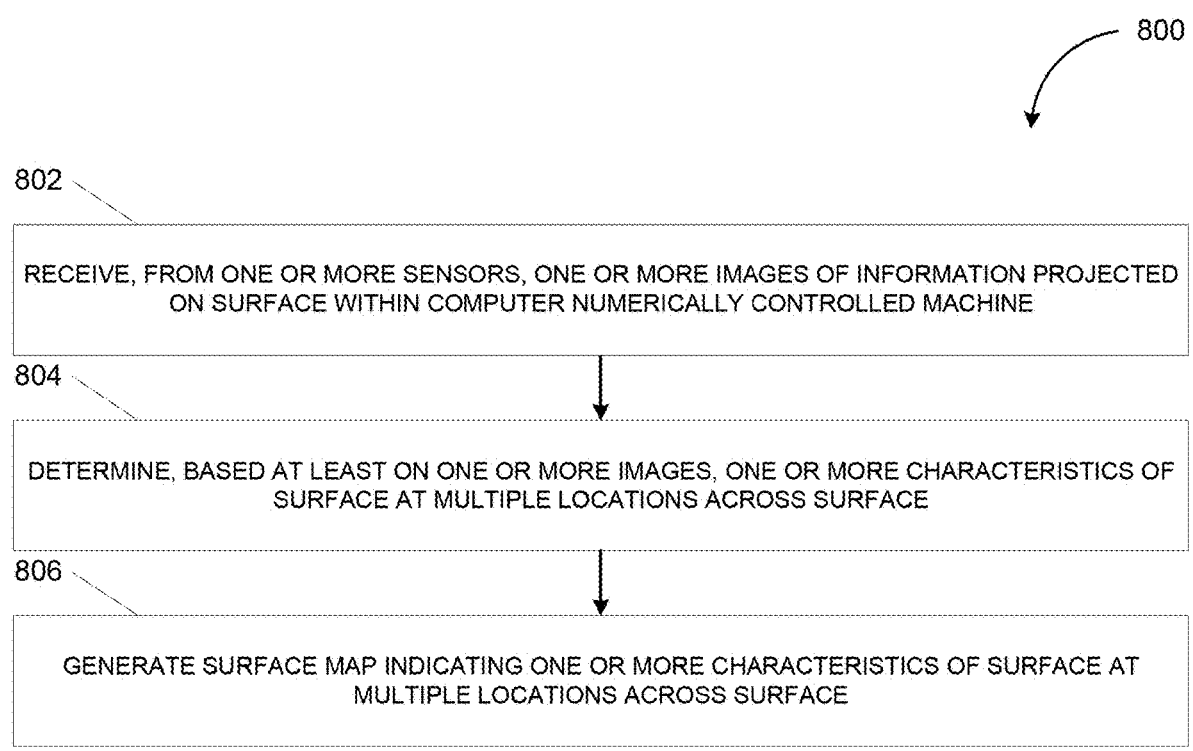
FIG. 8 is a flowchart illustrating a process for computer numerically controlled processing using projected information, consistent with implementations of the current subject matter.

FIG. 8 depicts a flowchart illustrating an example of a process 800 for computer numerically controlled processing using projected information consistent with implementations of the current subject matter. Referring to FIGS. 1-2, 3A-B, 4A-D, 5A-D, and 6-8, the process 800 may be performed by the controller 700 which, as noted, may be deployed locally at the computer numerically controlled machine 100 and/or remotely at the computer 710 and/or the server 720 communicatively coupled (e.g., via the network 730) with the computer numerically controlled machine 100.

At 802 the controller 700 may cause information to be projected on a surface within the computer numerically controlled machine 100. For example, the controller 700 may cause the light source 300 to project, on the surface of the material 140, structured light. In some implementations of the current subject matter, the structured light may be projected on a portion of the surface of the material 140 or substantially an entirety of the surface of the material 140. The structured light that may be projected on the surface of the material 140 may include multiple dots of light forming a pattern such as, for example, crisscrossed lines, a grid, and/or the like. The light source 300 may be a non-laser light source such as, for example, light emitting diodes (LEDs) and/or the like. Alternatively and/or additionally, the light source 300 may be laser light source (e.g., a Vertical-Cavity Surface Emitting Laser (VCSEL) array and/or the like) configured to generate an electromagnetic energy at a wavelength that is detectable by the one or more sensors 310 but having insufficient power to alter a physical appearance of the material 140 within the interior space of the computer numerically controlled machine 100.

In some implementations of the current subject matter, the light source 300 may be the head 160 and/or the optical elements configured to deliver an electromagnetic energy capable of altering the appearance of the material 140 within the computer numerically controlled machine 100. Accordingly, the power of the electromagnetic energy output by the light source 300 may be adjusted, for example, to a first level at which the electromagnetic energy is detectable by the sensors 310 but incapable of altering the appearance of the material 140. Moreover, the power of the electromagnetic energy output by the light source 300 may be increased, for example, to the second level sufficient to alter the appearance of the material 140 (e.g., by cutting and/or engraving the material 140).

At 804, the controller 700 may receive, from the one or more sensors 310, one or more images of the information projected on the surface in the computer numerically controlled machine 100. For example, the first sensor 310a, the second sensor 310b, and/or the third sensor 310c may generate one or more images of the surface of the material 140 disposed within the interior space of the computer numerically controlled machine 100, for example, on the material bed 150 and/or in the working area of the computer numerically controlled machine 100. The one or more images may capture substantially an entirety of the surface of the portion of the material 140 disposed within the interior space of the computer numerically controlled machine 100. Alternatively, the one or more images may capture one or more portions of the surface of the material 140 disposed within the interior space of the computer numerically controlled machine 100. The one or more images may capture information, such as some or all of the structured light that is projected on the surface of the material 140 by the light source 300.

At 806, the controller 700 may determine, based at least on the one or more images, one or more characteristics of the surface at multiple locations on the surface. For example, the controller 700 may determine, based on the one or more images, a size of the material 140, a distance to the surface of the material 140, a height of at least one surface of the material 140, a thickness of the material 140, an angle of the surface of the material 140, one or more edges of the material 140, one or more surface properties of the material 140 (e.g., absorptivity), a presence of jigs, a presence of fiducial alignment markers, a presence of one or more patterns encoding data (e.g., barcode), visual designs on the surface of the material 140 that are intended for reproduction, and/or the like. The one or more images, which may capture the structured light projected on the surface of the material 140, may enable the controller 700 to determine the characteristics of the surface of the material 140 at various locations on the surface of the material 140. For instance, the characteristics of the surface of the material 140 may be determined by comparing a property of the structured light shown in the one or more images to a known property of the structured light. The known property of the structured light may be determined based on one or more design characteristics of the light source 300 and/or through calibration of the computer numerically controlled machine 100. Accordingly, the images of the structured light may be used to determine the characteristics of the surface of the material 140 even when the surface of the material 140 exhibits various irregularities such as, for example, bumps, cracks, cavities, curvatures, ridges, slopes, and/or the like.

In some implementations of the current subject matter, one or more characteristics of the surface of the material 140 within the interior space of the computer numerically controlled machine 100 may be determined based on a comparison of a reference image of the structured light projected on a reference surface (e.g., a surface having no surface irregularities, a surface having one or more known surface irregularities, and/or the like) to the one or more image of the structured light projected on the surface of the material 140. The image of the surface of the material 140 may include one or more distortions to the structured light that correspond to irregularities that may be present on the surface of the material 140. As such, the controller 700 may perform one or more computations in order to determine a transform that may be applied to the one or more images of the surface of the material 140 to generate an image matching the reference image. For example, the transform may be applied to the one or more images of the surface of the material 140 to eliminate the one or more distortion corresponding to the irregularities that may be present on the surface of the material 140.

In some implementations of the current subject matter, one or more calibrations may be performed in order to account for distortions associated with the one or more sensors 310. As noted, the one or more sensors 310 may be configured to generate images that capture substantially an entirety of the surface of the material 140 disposed within the computer numerically controlled machine 100 (e.g., on the material bed 150 and/or the working area within the computer numerically controlled machine 100). Moreover, the one or more sensors 310 may include wide angle lenses, which may give rise to optical distortions (e.g., barrel distortion) when the material 140 is disposed a short distance from the one or more sensors 310 within the interior space of the computer numerically controlled machine 100. Accordingly, the controller 170 may perform calibrations to remove the distortions introduced by the sensors 310, for example, prior to computing the transform.

At 808, the controller 700 may generate a surface map indicating the one or more characteristics of the surface at multiple locations on the surface. For example, the controller 700 may generate a surface map that indicates a size of the material 140, a distance to the surface of the material 140, a height of at least one surface of the material 140, a thickness of the material 140, an angle of the surface of the material 140, one or more edges of the material 140, one or more surface properties of the material 140 (e.g., absorptivity), a presence of jigs, a presence of fiducial alignment markers, a presence of one or more patterns encoding data (e.g., barcode), visual designs on the surface of the material 140 that are intended for reproduction, and/or the like. The controller 700 may generate the surface map based at least on the transform that is computed to eliminate the distortions associated with the irregularities that may be present on the surface of the material 140. In some implementations of the current subject matter, the surface map may be used to calibrate, align, and/or optimize the computer numerically controlled machine 100. For example, the surface map may be used to determine one or more adjustments to a position and/or an orientation of one or more components delivering the electromagnetic energy (e.g., a height of the head 160), a speed of the one or more components delivering the electromagnetic energy (e.g., the head 160), a position and/or an orientation of the material bed 150, a position and/or an orientation one or more sensors (e.g., the one or more sensors 310), a power of the electromagnetic energy, and/or the like.

Figure 9:
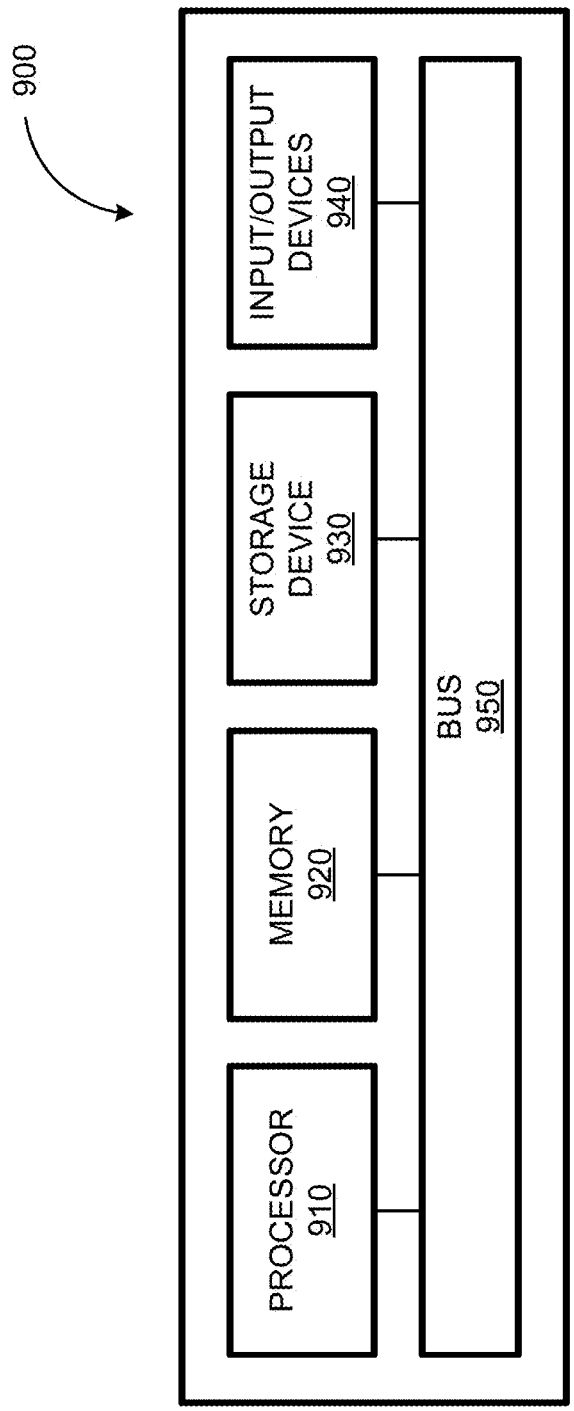
FIG. 9 depicts a block diagram illustrating a computing system, consistent with implementations of the current subject matter.

FIG. 9 depicts a block diagram illustrating a computing system 900, consistent with implementations of the current subject matter. Referring to FIGS. 1-2, 3A-B, 4A-D, 5A-D, and 6-9, the computing system 900 may implement the controller at the controller 700 and/or any components therein.

As shown in FIG. 9, the computing system 900 can include a processor 910, a memory 920, a storage device 930, and an input/output device 940. The processor 910, the memory 920, the storage device 930, and the input/output device 940 can be interconnected via a system bus 950. The processor 910 is capable of processing instructions for execution within the computing system 900. Such executed instructions can implement one or more components of, for example, the controller 700. In some implementations of the current subject matter, the processor 910 can be a single-threaded processor. Alternately, the processor 910 can be a multi-threaded processor. The processor 910 is capable of processing instructions stored in the memory 920 and/or on the storage device 930 to control at least some of the operations of the computer numerically controlled machine 100.

The memory 920 is a computer readable medium such as volatile or non-volatile that stores information within the computing system 900. The memory 920 can store data structures representing configuration object databases, for example. The storage device 930 is capable of providing persistent storage for the computing system 900. The storage device 930 can be a solid state drive, a floppy disk device, a hard disk device, an optical disk device, or a tape device, or other suitable persistent storage means. The input/output device 940 provides input/output operations for the computing system 900. In some implementations of the current subject matter, the input/output device 940 can provide input/output operations for a network device. For example, the input/output device 940 can include Ethernet ports or other networking ports to communicate with one or more wired and/or wireless networks (e.g., a local area network (LAN), a wide area network (WAN), the Internet).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method, comprising:
   projecting, by one or more light sources, a known number and arrangement of light rays as a structured light pattern on a surface within a computer numerically controlled machine configured to deliver electromagnetic energy;
   receiving, from one or more sensors, image data representing the projected structured light pattern that includes one or more distortions caused by one or more characteristics of the surface at one or more locations on the surface;
   generating, based on the image data, an image of the projected structured light pattern that includes the one or more distortions;
   comparing the image of the projected structured light pattern that includes the one or more distortions to a reference image of an undistorted version of the structured light pattern;
   based on the comparison, identifying the one or more characteristics of the surface at the one or more locations on the surface, wherein the one or more locations on the surface corresponds to the known number and arrangement of light rays; and
   generating a surface map indicating the one or more characteristics of the surface at the one or more locations on the surface.

2. The method of claim 1, wherein the structured light pattern comprises a visible light, and wherein the one or more sensors comprise a camera capable of capturing the visible light.

3. The method of claim 1, wherein the structured light pattern comprises an infrared light, and wherein the one or more sensors comprise a camera capable of capturing a visible light and the infrared light.

4. The method of claim 1, wherein the one or more characteristics include a size, a distance, a height, a thickness, an edge, an angle, an absorptivity of the surface, a presence of a jig, a pattern encoding data, visual designs on the surface of the material that are intended for reproduction, and/or a presence of a fiducial alignment marker.

5. The method of claim 1, wherein the image of the projected structured light pattern captures an entirety of the surface within the computer numerically controlled machine and/or an entirety of the projected structured light pattern.

6. The method of claim 1, wherein the surface comprises a surface of a material disposed within the computer numerically controlled machine.

7. The method of claim 6, further comprising:
generating, based at least on the image data representing the projected structured light pattern, a graphic user interface providing a preview of the surface of the material, the preview of the surface of the material identifying the one or more characteristics of the surface at the one or more locations on the surface of the material.

8. The method of claim 6, wherein the image of the projected structured light pattern is a first image, the method further comprising: generating, based on the image data received from the one or more sensors, a second image of the surface of the material without the structured light pattern projected on the surface of the material; and generating, based at least on the second image, a graphic user interface providing a preview of the surface of the material.

9. The method of claim 6, further comprising processing, based at least on the surface map, the material, wherein processing the material comprises delivering electromagnetic energy to affect one or more changes in the material.

10. The method of claim 9, wherein the surface map is a first surface map, the method further comprising:
generating a second surface map of the material subsequent to delivering electromagnetic energy to affect the one or more changes in the material.

11. The method of claim 10, further comprising determining, based at least on the second surface map, whether the one or more changes are consistent with an intended final appearance of the material.

12. The method of claim 10, further comprising determining, based at least on the second surface map, a variability in a power level of electromagnetic energy.

13. The method of claim 1, wherein the surface comprises a surface of a component of the computer numerically controlled machine.

14. The method of claim 13, further comprising determining, based at least on the surface map, one or more configurations of the computer numerically controlled machine including an addition and/or a removal of the component of the computer numerically controlled machine.

15. The method of claim 1, wherein the one or more light sources comprises a non-laser light source.

16. The method of claim 1, wherein the one or more light sources comprises a laser light source.

17. The method of claim 16, wherein the laser light source comprises a Vertical-Cavity Surface Emitting Laser (VCSEL) array.

18. The method of claim 16, wherein the laser light source comprises a source of electromagnetic energy, and wherein the structured light pattern is projected by the source of electromagnetic energy at a reduced power level such that electromagnetic energy delivered is incapable of altering an appearance of the surface.

19. The method of claim 18, wherein the image of the projected structured light pattern comprises a first image of the structured light pattern projected by the source of electromagnetic energy operating at a first power level, and wherein a power of electromagnetic energy delivered by the source of electromagnetic energy operating at a higher power level is extrapolated based at least on the first image of the projected structured light pattern and a second image of the structured light pattern projected by the source of electromagnetic energy operating at a second power level.

20. The method of claim 19, further comprising detecting, based at least on the first image, the second image, and a third image of the projected structured light pattern received at a different time than the first image and the second image, a loss in the power of electromagnetic energy.

21. The method of claim 1, further comprising:
adjusting, based at least on a proportion of electromagnetic energy absorbed by the surface, one or more of a power of electromagnetic energy, a focus of electromagnetic energy, a filter of the one or more sensors, an aperture of the one or more sensors, and a shutter speed of the one or more sensors.

22. The method of claim 1, wherein the image of the projected structured light pattern is a first image, and wherein comparing the first image to the reference image of the undistorted version of the structured light pattern comprises determining a transform configured to generate, based at least on the first image, a second image matching the reference image of the undistorted version of the structured light pattern, and wherein the transform generates the second image by at least eliminating one or more distortions in the first image of the structured light pattern corresponding to one or more irregularities on the surface.

23. The method of claim 22, wherein the surface map is generated based at least on the transform.

24. The method of claim 1, further comprising:
performing one or more calibrations to remove, from the image of the projected structured light pattern, one or more optical distortions associated with the one or more sensors, the one or more optical distortions including an optical distortion associated with the surface being disposed at a short distance from the one or more sensors.

25. A system, comprising:
at least one data processor;
non-transitory computer-readable medium; and
program instructions stored on the non-transitory computer-readable medium that are executable by the at least one processor such that a computing device is configured to:
project, by one or more light sources, a known number and arrangement of light rays as a structured light pattern on a surface within a computer numerically controlled machine configured to deliver electromagnetic energy;
receive, from one or more sensors, image data representing the projected structured light pattern that includes one or more distortions caused by one or more characteristics of the surface at one or more locations on the surface;
generate, based on the image data, an image of the projected structured light pattern that includes the one or more distortions;

compare the image of the projected structured light pattern that includes the one or more distortions to a reference image of an undistorted version of the structured light pattern;

based on the comparison, identify the one or more characteristics of the surface at the one or more locations on the surface, wherein the one or more locations on the surface corresponds to the known number and arrangement of light rays; and generate a surface map indicating the one or more characteristics of the surface at the one or more locations on the surface.

26. The system of claim 25, wherein the one or more characteristics include a size, a distance, a height, a thickness, an edge, an angle, an absorptivity of the surface, a presence of a jig, a pattern encoding data, visual designs on the surface that are intended for reproduction, and/or a presence of a fiducial alignment marker.

27. The system of claim 25, wherein the image of the projected structured light pattern captures an entirety of the surface within the computer numerically controlled machine and/or an entirety of the projected structured light pattern.

28. The system of claim 25, wherein the surface comprises a surface of a material disposed within the computer numerically controlled machine.

29. The system of claim 28, further comprising further program instructions stored on the non-transitory computer-readable medium that are executable by the at least one processor such that the computing device is configured to:

generate, based at least on the image data representing the projected structured light pattern, a graphic user interface providing a preview of the surface of the material, the preview of the surface of the material identifying the one or more characteristics of the surface at the one or more locations on the surface of the material.

30. The system of claim 28, wherein the image of the projected structured light pattern is a first image, the system further comprising further program instructions stored on the non-transitory computer-readable medium that are executable by the at least one processor such that the computing device is configured to:

generate, based on the image data received from the one or more sensors, a second image of the surface of the material without the structured light pattern projected on the surface of the material; and generate, based at least on the second image, a graphic user interface providing a preview of the surface of the material.

31. The system of claim 28, further comprising further program instructions stored on the non-transitory computer-readable medium that are executable by the at least one processor such that the computing device is configured to process, based at least on the surface map, the material, wherein processing the material comprises delivering electromagnetic energy to affect one or more changes in the material.

32. The system of claim 31, wherein the surface map is a first surface map, the system further comprising further program instructions stored on the non-transitory computer-readable medium that are executable by the at least one processor such that the computing device is configured to:

generate a second surface map of the material subsequent to delivering electromagnetic energy to affect the one or more changes in the material; and determine, based at least on the second surface map, at least one of (i) a consistency of the one or more changes relative to an intended final appearance of the material and (ii) a variability in a power level of electromagnetic energy.

33. The system of claim 25, wherein the one or more light sources comprises a non-laser light source.

34. The system of claim 25, wherein the one or more light sources comprises a laser light source comprising a Vertical-Cavity Surface Emitting Laser (VCSEL) array, the structured light.

35. The system of claim 25, wherein the one or more light sources comprise a source of electromagnetic energy, and wherein the structured light pattern is projected by the source of electromagnetic energy at a reduced power level such that electromagnetic energy delivered is incapable of altering an appearance of the surface.

36. The system of claim 35, wherein the image comprises a first image of the structured light pattern projected by the source of electromagnetic energy operating at a first power level, and wherein a power of electromagnetic energy delivered by the source of electromagnetic energy operating at a higher power level is extrapolated based at least on the first image and a second image of the structured light pattern projected by the source of electromagnetic energy operating at a second power level.

37. The system of claim 36, further comprising further program instructions stored on the non-transitory computer-readable medium that are executable by the at least one processor such that the computing device is configured to detect, based at least on the first image, the second image, and a third image of the structured light pattern generated at a different time than the first image and the second image, a loss in the power of electromagnetic energy.

38. The system of claim 25, further comprising further program instructions stored on the non-transitory computer-readable medium that are executable by the at least one processor such that the computing device is configured to:

adjust, based at least on a proportion of electromagnetic energy absorbed by the surface, one or more of a power of electromagnetic energy, a focus of electromagnetic energy, a filter of the one or more sensors, an aperture of the one or more sensors, and a shutter speed of the one or more sensors.

39. The system of claim 25, wherein the image of the projected structured light pattern is a first image, and wherein the program instructions stored on the non-transitory computer-readable medium that are executable by the at least one processor such that the computing device is configured to compare the first image and the reference image of the undistorted version of the structured light pattern comprise further program instructions that are executable by the at least one processor such that the computing device is configured to determine a transform configured to generate, based at least on the first image, a second image matching a reference pattern, wherein the transform generates the second image by at least eliminating one or more distortions in the first image of the structured light pattern corresponding to one or more irregularities on the surface, and wherein the surface map is generated based at least on the transform.

40. A non-transitory computer-readable medium, wherein the non-transitory computer-readable medium is provisioned with program instructions that, when executed by at least one processor, cause a computing device to:

project, by one or more light sources, a known number and arrangement of light rays as a structured light pattern on a surface within a computer numerically controlled machine having a head configured to deliver electromagnetic energy;

receive, from one or more sensors, image data representing the projected structured light pattern that includes one or more distortions caused by one or more characteristics of the surface at one or more locations on the surface;

generate, based on the image data, an image of the projected structured light pattern that includes the one or more distortions;

compare the image of the projected structured light pattern that includes the one or more distortions to a reference image of an undistorted version of the structured light pattern;

based on the comparison, identify the one or more characteristics of the surface at the one or more locations on the surface, wherein the one or more locations on the surface corresponds to the known number and arrangement of light rays; and generate a surface map indicating the one or more characteristics of the surface at the one or more locations on the surface.

* * * * *